United States Patent
Park et al.

(10) Patent No.: US 9,625,330 B2
(45) Date of Patent: Apr. 18, 2017

(54) METHODS AND APPARATUS CONCERNING MULTI-TACTILE SENSITIVE (E-SKIN) PRESSURE SENSORS

(71) Applicant: The Board of Trustees of the Leland Stanford Junior University, Palo Alto, CA (US)

(72) Inventors: Steve J. Park, Stanford, CA (US); Zhenan Bao, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 14/815,572

(22) Filed: Jul. 31, 2015

(65) Prior Publication Data

US 2016/0033343 A1    Feb. 4, 2016

Related U.S. Application Data

(60) Provisional application No. 62/032,233, filed on Aug. 1, 2014.

(51) Int. Cl.
| | |
|---|---|
| *G01D 7/00* | (2006.01) |
| *G01L 1/20* | (2006.01) |
| *G01L 1/14* | (2006.01) |
| *G01H 11/06* | (2006.01) |

(52) U.S. Cl.
CPC ............... *G01L 1/205* (2013.01); *G01L 1/146* (2013.01); *G01H 11/06* (2013.01)

(58) Field of Classification Search
CPC .......... G01L 1/205; G01L 1/146; G01H 11/06

USPC .................................. 73/777, 780, 862.046
See application file for complete search history.

(56) References Cited

U.S. PATENT DOCUMENTS

| | | | | |
|---|---|---|---|---|
| 4,314,227 | A | | 2/1982 | Eventoff |
| 5,302,936 | A | | 4/1994 | Yaniger |
| 5,989,700 | A | | 11/1999 | Krivopal |
| 6,413,409 | B1 | * | 7/2002 | Otowa .................... C02F 1/008 204/257 |
| 6,490,920 | B1 | * | 12/2002 | Netzer .................... G01C 9/06 324/687 |
| 6,589,629 | B1 | | 7/2003 | Bao et al. |
| 7,137,291 | B2 | | 11/2006 | Mancevski |
| 7,785,704 | B2 | | 8/2010 | Papakostas et al. |
| 8,020,456 | B2 | | 9/2011 | Liu et al. |

(Continued)

OTHER PUBLICATIONS

Gao, Qiang, et al. "Flexible tactile sensor using the reversible deformation of poly (3-hexylthiophene) nanofiber assemblies." Langmuir 28.51 (2012): 17593-17596.

(Continued)

*Primary Examiner* — Max Noori
(74) *Attorney, Agent, or Firm* — Crawford Maunu PLLC

(57) ABSTRACT

Various aspects as described herein are directed to electronic skin pressure sensors and methods of using the same. As consistent with one or more embodiments, an apparatus includes an electronic skin pressure sensor and sensor circuitry. The electronic skin device is configured and arranged for differentiating between different mechanical stimuli including lateral stress and at least one additional mechanical stimuli. The sensor circuitry is configured and arranged to respond to the electronic skin pressure sensor by sensing a change in impedance due to the lateral stress.

21 Claims, 28 Drawing Sheets

(56) References Cited

U.S. PATENT DOCUMENTS

| | | | |
|---|---|---|---|
| 8,161,826 B1 | 4/2012 | Taylor | |
| 8,764,668 B2 | 7/2014 | Roteliuk et al. | |
| 8,764,670 B2 | 7/2014 | Sawanoi et al. | |
| 2006/0260417 A1 | 11/2006 | Son et al. | |
| 2011/0034328 A1 | 2/2011 | Kang et al. | |
| 2011/0108936 A1 | 5/2011 | Meng et al. | |
| 2011/0192233 A1 | 8/2011 | Aizenberg et al. | |
| 2011/0314935 A1* | 12/2011 | Krippner | G01L 3/1457 73/862.045 |
| 2012/0062245 A1 | 3/2012 | Bao et al. | |
| 2012/0177934 A1 | 7/2012 | Vogel et al. | |
| 2012/0301607 A1 | 11/2012 | Kabir et al. | |
| 2015/0280129 A1* | 10/2015 | Kim | H01L 51/0004 257/40 |
| 2016/0008206 A1* | 1/2016 | Devanaboyina | A47C 9/002 601/136 |

OTHER PUBLICATIONS

Maheshwari, Vivek, and Ravi F. Saraf. "High-resolution thin-film device to sense texture by touch." Science 312.5779 (2006): 1501-1504.

Segev-Bar, Meital, et al. "Tunable touch sensor and combined sensing platform: toward nanoparticle-based electronic skin." ACS applied materials & interfaces 5.12 (2013): 5531-5541. Abstract Only.

Yao, Hong-Bin, et al. "A flexible and highly pressure—sensitive graphene—polyurethane sponge based on fractured microstructure design." Advanced Materials 25.46 (2013): 6692-6698. Abstract Only.

Liu, Xinchuan, et al. "A highly sensitive pressure sensor using a Au-patterned polydimethylsiloxane membrane for biosensing applications." Journal of Micromechanics and Microengineering 23.2 (2013): 025022.

Choong, Chwee-Lin, et al. "Highly stretchable resistive pressure sensors using a conductive elastomeric composite on a micropyramid array." Advanced Materials 26.21 (2014): 3451-3458.

Cai, Le, et al. "Super-stretchable, transparent carbon nanotube-based capacitive strain sensors for human motion detection." Scientific reports 3 (2013).

Lin, Lin, et al. "Towards tunable sensitivity of electrical property to strain for conductive polymer composites based on thermoplastic elastomer." ACS applied materials & interfaces 5.12 (2013): 5815-5824. Abstract Only.

Cohen, Daniel J., et al. "A highly elastic, capacitive strain gauge based on percolating nanotube networks." Nano letters 12.4 (2012): 1821-1825. Abstract Only.

Matsuzaki, Ryosuke, et al. "Rubber-based strain sensor fabricated using photolithography for intelligent tires." Sensors and Actuators A: Physical 148.1 (2008): 1-9.

Xiao, Xu, et al. "High—Strain Sensors Based on ZnO Nanowire/Polystyrene Hybridized Flexible Films." Advanced Materials 23.45 (2011): 5440-5444.

Cha, Seung Nam, et al. "Sound—Driven Piezoelectric Nanowire—Based Nanogenerators." Advanced materials 22.42 (2010): 4726-4730.

Wang, Xudong, et al. "Direct-current nanogenerator driven by ultrasonic waves." Science 316.5821 (2007): 102-105.

Wang, Zhong Lin, and Jinhui Song. "Piezoelectric nanogenerators based on zinc oxide nanowire arrays." Science 312.5771 (2006): 242-246.

Kim, Hyunjin, et al. "Enhancement of piezoelectricity via electrostatic effects on a textile platform." Energy & Environmental Science 5.10 (2012): 8932-8936. Abstract Only.

Xu, Sheng, et al. "Self-powered nanowire devices." Nature nanotechnology 5.5 (2010): 366-373.

Chang, Chieh, et al. "Direct-write piezoelectric polymeric nanogenerator with high energy conversion efficiency." Nano letters 10.2 (2010): 726-731.

Cha, SeungNam, et al. "Porous PVDF as effective sonic wave driven nanogenerators." Nano letters 11.12 (2011): 5142-5147.

Chang, Jiyoung, et al. "Piezoelectric nanofibers for energy scavenging applications." Nano Energy 1.3 (2012): 356-371.

Lee, Ju-Hyuck, et al. "Highly Stretchable Piezoelectric—Pyroelectric Hybrid Nanogenerator." Advanced Materials 26.5 (2014): 765-769.

Park, Kwi-Il, et al. "Flexible nanocomposite generator made of BaTiO3 nanoparticles and graphitic carbons." Advanced Materials 24.22 (2012): 2999-3004.

Wu, Wenzhuo, Xiaonan Wen, and Zhong Lin Wang. "Taxel-addressable matrix of vertical-nanowire piezotronic transistors for active and adaptive tactile imaging." Science 340.6135 (2013): 952-957.

Fan, Feng-Ru, et al. "Transparent triboelectric nanogenerators and self-powered pressure sensors based on micropatterned plastic films." Nano letters 12.6 (2012): 3109-3114.

Lin, Long, et al. Triboelectric active sensor array for self-powered static and dynamic pressure detection and tactile imaging. ACS nano 7.9 (2013): 8266-8274.

Lin, Zong-Hong, et al. "Enhanced Triboelectric Nanogenerators and Triboelectric Nanosensor Using Chemically Modified TiO2 Nanomaterials." ACS nano T5 (2013): 4554-4560.

Yang, Ya, et al. "Human skin based triboelectric nanogenerators for harvesting biomechanical energy and as self-powered active tactile sensor system." ACS nano 7.10 (2013): 9213-9222.

Yang, Ya, et al. "Electret Film-Enhanced Triboelectric Nanogenerator Matrix for Self-Powered Instantaneous Tactile Imaging." ACS applied materials & interfaces 6.5 (2014): 3680-3688.

Sekitani, Tsuyoshi, and Takao Someya. "Stretchable, Large—area Organic Electronics." Advanced Materials 22.20 (2010): 2228-2246. Abstract Only.

Rogers, John A., Takao Someya, and Yonggang Huang. "Materials and mechanics for stretchable electronics." Science 327.5973 (2010): 1603-1607.

Mi, Yongli, et al. "Micromolding of PDMS scaffolds and microwells for tissue culture and cell patterning: A new method of microfabrication by the self-assembled micropatterns of diblock copolymer micelles." Polymer 47.14 (2006): 5124-5130.

Balaban, Nathalie Q., et al. "Force and focal adhesion assembly: a close relationship studied using elastic micropatterned substrates." Nature cell biology 3.5 (2001): 466-472.

Sekitani, Tsuyoshi, et al. "A rubberlike stretchable active matrix using elastic conductors." Science 321.5895 (2008): 1468-1472. Abstract Only.

Wang, Sihong, Long Lin, and Zhong Lin Wang. "Nanoscale triboelectric-effect-enabled energy conversion for sustainably powering portable electronics." Nano letters 12.12 (2012): 6339-6346.

Hu, Youfan, et al. "Triboelectric nanogenerator built on suspended 3D spiral structure as vibration and positioning sensor and wave energy harvester" ACS nano 7.11 (2013): 10424-10432.

Yang, Jin, et al. "Triboelectrification-based organic film nanogenerator for acoustic energy harvesting and self-powered active acoustic sensing." ACS nano 8.3 (2014): 2649-2657.

Zhu, Guang, et al. "Toward large-scale energy harvesting by a nanoparticle-enhanced triboelectric nanogenerator." Nano letters 132 (2013): 847-853.

Bai, Peng, et al. "Integrated multilayered triboelectric nanogenerator for harvesting biomechanical energy from human motions." Acs Nano 7.4 (2013): 3713-3719.

Zhong, Junwen, et al. "Finger typing driven triboelectric nanogenerator and its use for instantaneously lighting up LEDs." Nano Energy 2.4 (2013): 491-497. Abstract Only.

Zhang, Xiao-Sheng, et al. "Frequency-multiplication high-output triboelectric nanogenerator for sustainably powering biomedical microsystems." Nano letters 13.3 (2013): 1168-1172. Abstract Only.

Wang, Sihong, et al. "Freestanding Triboelectric—Layer—Based Nanogenerators for Harvesting Energy from a Moving Object or Human Motion in Contact and Non—contact Modes." Advanced Materials 26.18 (2014): 2818-2824.

(56) References Cited

OTHER PUBLICATIONS

Cheng, Gang, et al. "Increase Output Energy and Operation Frequency of a Triboelectric Nanogenerator by Two Grounded Electrodes Approach." Advanced Functional Materials 24.19 (2014): 2892-2898.

Lin, Long, et al. "Segmentally structured disk triboelectric nanogenerator for harvesting rotational mechanical energy." Nano letters 13.6 (2013): 2916-2923.

Wang, Zhong Lin. "Triboelectric nanogenerators as new energy technology for self-powered systems and as active mechanical and chemical sensors." ACS nano 7.11 (2013): 9533-9557.

Wang, Sihong, et al. "Sliding-triboelectric nanogenerators based on in-plane charge-separation mechanism." Nano letters 13.5 (2013): 2226-2233.

Ishikawa, Fumiaki N., et al. "Transparent electronics based on transfer printed aligned carbon nanotubes on rigid and flexible substrates." ACS nano 3.1 (2008): 73-79.

Surapaneni, R., et al. "A three-axis high-resolution capacitive tactile imager system based on floating comb electrodes." Journal of Micromechanics and Microengineering 23.7 (2013): 075004. Abstract Only.

Liao, K. W., Max T. Hou, and J. Andrew Yeh. "A dielectiric liquid-based capcitive tactile sensor for normal and shear force sensing." Solid-State Sensors, Actuators and Microsystems (Transducers & Eurosensors XXVII), 2013 Transducers & Eurosensors The 17th International Conference on. IEEE, 2013. Abstract Only.

Dobrzynska, Jagoda Anna, and M. A. M. Gijs. "Polymer-based flexible capacitive sensor for three-axial force measurements." Journal of Micromechanics and Microengineering 23.1 (2013): 015009. Abstrasct Only.

Lee, Hyung-Kew, et al. "Real-time measurement of the three-axis contact force distribution using a flexible capacitive polymer tactile sensor." Journal of Micromechanics and Microengineering 21.3 (2011): 035010.

Deepu, Chacko John, et al. "An ECG-on-chip for wearable cardiac monitoring devices." Electronic Design, Test and Application, 2010. Delta'10. Fifth IEEE International Symposium on. IEEE, 2010.

Pantelopoulos, Alexandros, and Nikolaos G. Bourbakis. "A survey on wearable sensor-based systems for health monitoring and prognosis." Systems, Man, and Cybernetics, Part C: Applications and Reviews, IEEE Transactions on 40.1 (2010): 1-12.

Zhang, Da Ren, et al. "A wireless ECG plaster for real-time cardiac health monitoring in body sensor networks." Biomedical Circuits and Systems Conference (BioCAS), 2011 IEEE. IEEE, 2011.

Zhu, Guang, et al. "Triboelectric-generator-driven pulse electrodeposition for micropatterning." Nano letters 12.9 (2012): 4960-4965.

Que, Ronghui, et al. "Flexible nanogenerators based on graphene oxide films for acoustic energy harvesting." Angewandte Chemie 124.22 (2012): 5514-5518. Abstract Only.

Hinchet, Ronan, et al. "Performance Optimization of Vertical Nanowire—based Piezoelectric Nanogenerators." Advanced Functional Materials 24.7 (2014): 971-977.

Lee, Keun Young, et al. "P-Type polymer-hybridized high-performance piezoelectric nanogenerators." Nano letters 12.4 (2012): 1959-1964.

Yu, Zhibin, et al. "Highly Flexible Silver Nanowire Electrodes for Shape—Memory Polymer Light—Emitting Diodes." Advanced Materials 23.5 (2011): 664-668. Abstract Only.

Xu, Feng, and Yong Zhu. "Highly conductive and stretchable silver nanowire conductors." Advanced Materials 24.37 (2012): 5117-5122.

Park, Minwoo, et al. "Highly stretchable electric circuits from a composite material of silver nanoparticles and elastomeric fibres." Nature nanotechnology 7.12 (2012): 803-809. Abstract Only.

Feng, Xue, et al. "Stretchable ferroelectric nanoribbons with wavy configurations on elastomeric substrates." Acs Nano 5.4 (2011): 3326-3332.

Lekkala, J. et al. "EMF force sensor-a flexible and sensitive electret film for physiological applications." Medical and Biological Engineering and Computing 34 (1996): 67-68.

Bauer, Siegfried, Reimund Gerhard-Multhaupt, and Gerhard M. Sessler. "Ferroelectrets: Soft electroactive foams for transducers." Physics Today 572 (2004): 37-43. Abstract Only.

Zhang, Xiaoqing, et al. "Piezoelectric properties of irradiation-crosslinked polypropylene ferroelectrets." Applied Physics Letters 91.18 (2007): 2901. Abstract Only.

Zhang, Xiaoqing, et al. "Quasi-static and dynamic piezoelectric d 33 coefficients of irradiation cross-linked polypropylene ferroelectrets." Journal of materials science 44.10 (2009): 2459-2465. Abstract Only.

Zhang, X., et al. "Piezoelectric coefficients of cross-linked polypropylene films stretched at elevated temperatures." Journal of Electrostatics 69.6 (2011): 554-558. Abstract Only.

Wegener, M., et al. "Controlled inflation of voids in cellular polymer ferroelectrets: Optimizing electromechanical transducer properties." Applied Physics Letters 84.3 (2004): 392-394.

Hillenbrand, Joachim, Gerhard M. Sessler, and Xiaoqing Zhang. "Verification of a model for the piezoelectric d33 coefficient of cellular electret films." Journal of applied physics 98.6 (2005): 4105. Abstract Only.

Ver der Vegt, A. K. "From Polymers to Plastics." Dup Blue Print, Delft University Press, The Netherlands (2002): 16. Book.

Neugschwandtner, G. S., et al. "Large and broadband piezoelectricity in smart polymer-foam space-charge electrets." Applied Physics Letters 77.23 (2000): 3827-3829. Abstract Only.

Mellinger, Axel. "Dielectric resonance spectroscopy: a versatile tool in the quest for better piezoelectric polymers." Dielectrics and Electrical Insulation, IEEE Transactions on 10.5 (2003): 842-861. Abstract Only.

Kressmann, Reiner. "Linear and nonlinear piezoelectric response of charged cellular polypropylene." Journal of Applied Physics 90.7 (2001): 3489-3496. Abstract Only.

Hillenbrand, J., and G. M. Sessler. "Piezoelectricity in cellular electret films." Dielectrics and Electrical Insulation, IEEE Transactions on 7.4 (2000): 537-542. Abstract Only.

Sessler, G. M., and J. Hillenbrand. "Electromechanical response of cellular electret films." Applied Physics Letters 75.21 (1999): 3405-3407. Abstract Only.

Qi, Yi, et al. "Enhanced piezoelectricity and stretchability in energy harvesting devices fabricated from buckled PZT ribbons." Nano letters 11.3 (2011): 1331-1336.

Ko, Hyunhyub, et al. "Multifunctional, flexible electronic systems based on engineered nanostructured materials." Nanotechnology 23.34 (2012): 344001.

Oaki, Y. Kijima, M., Imai, H. Synthesis and Morphogenesis of Organic Polymer Materials with Hierarchical Structures in Biominerals. J. Am. Chem. Soc.133, 8594-8599 (2011). Abstract Only.

Hillis, W. D. A high-resolution imaging touch sensor. Int. J. Robot. Res.1, 33-44 (1982). Abstract Only.

Barnoss, S., et al. Piezoresistance in chemically synthesized polypyrrole thin films. Sensor. Actuat. A-Phys.154, 79-84 (2009).

Scilingo, E. P., et al. Strain-sensing fabrics for wearable kinaesthetic-like systems. IEEE Sensor. J.3, 460-467 (2003).

Wu, J., et al. Conducting polymer coated lycra. Synth. Met.155, 698-701 (2005). Abstract Only.

Kim, D. H. et al. Epidermal Electronics. Science 333, 838-843 (2011).

Sokolov, A. N., Tee, B. C. K., Bettinger, C. J., Tok, J. B. H. & Bao, Z. Chemical and engineering approaches to enable organic field-effect transistors for electronic skin applications. Acc. Chem. Res. 45, 361-371 (2012). Abstract Only.

Wagner, S. & Bauer, S. Materials for stretchable electronics. MRS Bull. 37, 207-217 (2012).

Lumelsky, V. J., Shur, M. S. & Wagner, S. Sensitive skin. IEEE Sens. J. 1, 41-51 (2001).

Someya, T. et al. A large-area, flexible pressure sensor matrix with organic fieldeffect transistors for artificial skin applications. Proc. Natl Acad. Sci. USA 101, 9966-9970 (2004).

(56) References Cited

OTHER PUBLICATIONS

Mannsfeld, S. C. B. et al. Highly sensitive flexible pressure sensors with microstructured rubber dielectric layers. Nat. Mater. 9, 859-864 (2010).

Takei, K. et al. Nanowire active-matrix circuitry for low-voltage macroscale artificial skin. Nat. Mater. 9, 821-826 (2010).

Hu, W. L., Niu, X. F., Zhao, R. & Pei, Q. B. Elastomeric transparent capacitive sensors based on an interpenetrating composite of silver nanowires and polyurethane. Appl. Phys. Lett. 102, 083303 (2013).

Schwartz, G. et al. Flexible polymer transistors with high pressure sensitivity for application in electronic skin and health monitoring. Nat. Commun. 4, 1859-1859 (2013). Abstract Only.

Jeon, J., Lee, H.-B.-R. & Bao, Z. Flexible wireless temperature sensors based on Ni microparticle-filled binary polymer composites. Adv. Mater. 25, 850-855 (2013). Abstract Only.

Feng, J. et al. Giant moisture responsiveness of VS2 ultrathin nanosheets for novel touchless positioning interface. Adv. Mater. 24, 1969-1974 (2012). Abstract Only.

Tian, B. et al. Three-dimensional, flexible nanoscale field-effect transistors as localized bioprobes. Science 329, 830-834 (2010).

Viventi, J. et al. Flexible, foldable, actively multiplexed, high-density electrode array for mapping brain activity in vivo. Nat. Neurosci. 14, 1599-1605 (2011).

Roberts, M. E. et al. Water-stable organic transistors and their application in chemical and biological sensors. Proc. Natl Acad. Sci. USA 105, 12134-12139 (2008).

Li, D., Huang, J. & Kaner, R. B. Polyaniline nanofibers: a unique polymer nanostructure for versatile applications. Acc. Chem. Res. 42, 135-145 (2009).

Yamada, T. et al. A stretchable carbon nanotube strain sensor for humanmotion detection. Nat. Nanotechn. 6, 296-301 (2011).

Lipomi, D. J. et al. Skin-like pressure and strain sensors based on transparent elastic films of carbon nanotubes. Nat. Nanotechn. 6, 788-792 (2011). Abstract Only.

Pang, C. et al. A flexible and highly sensitive strain-gauge sensor using reversible interlocking of nanofibres. Nat. Mater. 11, 795-801 (2012).

Maheshwari, V. & Saraf, R. Tactile devices to sense touch on a par with a human finger. Angew. Chem. Int. Edit. 47, 7808-7826 (2008). Abstract Only.

Tee, B. C. K., Wang, C., Allen, R. & Bao, Z. An electrically and mechanically self-healing composite with pressure- and flexion-sensitive properties for electronic skin applications. Nat. Nanotechn. 7, 825-832 (2012). Abstract Only.

Wang, L. & Li, Y. A review for conductive polymer piezoresistive composites and a development of a compliant pressure transducer. IEEE Trans. Instru. Measu. 62, 495-502 (2013).

Hatzivasiliou, F. V. & Tzafestas, S. G. Analysis and design of a new piezoresistive tactile sensor system for robotic applications. J. Intell. Robot. Syst. 10, 243-256 (1994).

Ferguson-Pell, M., Hagisawa, S. & Bain, D. Evaluation of a sensor for low interface pressure applications. Med. Eng. Phys. 22, 657-663 (2000). Abstract Only.

Rosenberg, I. & Perlin, K. The UnMousePad—an interpolating multi-touch force-sensing input pad. ACM Trans. Graph. 28, 65 (2009).

Shan, Z. W. et al. Ultrahigh stress and strain in hierarchically structured hollow nanoparticles. Nat. Mater. 7,947-952 (2008).

Mahmoud, W. E., El-Eraki, M. H. I., El-Lawindy, A. M. Y. & Hassan, H. H. A novel application of ADC/K-foaming agent-loaded NBR rubber composites as pressure sensor. J. Phys. D-Appl. Phys. 39,541-546 (2006).

Brady, S., Diamond, D. & Lau, K. T. Inherently conducting polymer modified polyurethane smart foam for pressure sensing. Sensor Actuat. A-Phys. 119,398-404 (2005).

Metzger, C. et al. Flexible-foam-based capacitive sensor arrays for object detection at low cost. Appl. Phys. Lett. 92, 013506 (2008).

Piepenbrock, M.-O. M., Lloyd, G. O., Clarke, N. & Steed, J. W. Metal- and anion-binding supramolecular gels. Chem. Rev. 110,1960-2004 (2010). First Page Only.

Yulia Galagan et al. Technology development for roll-to-roll production of organic photovoltaics. Chem. Eng. Process 50,454-461 (2011). Abstract Only.

Mark, J. Polymer Data Handbook. (Oxford Univ. Press, 1999). Book, E-Copy Not Provided.

Gibson, L. J. & Ashby, M. F. in Cellular Solids: Structure and Properties (Pergamon, 1997). Book, E-Copy Not Provided.

Kim, K. H., Oh, Y. & Islam, M. F. Graphene coating makes carbon nanotube aerogels superelastic and resistant to fatigue. Nat. Nanotechn. 7,562-566 (2012).

Hillis, W. D. A high-resolution imaging touch sensor. Int. J. Robot Res. 1,33-44 (1982). Abstract Only.

Gorce, J. N., Hellgeth, J. W. & Ward, T. C. Mechanical hysteresis of a polyether polyurethane thermoplastic elastomer. Polym. Eng. Sci. 33,1170-1176 (1993). Abstract Only.

Etchessahar, M. & Sahraoui, S. Frequency dependence of elastic properties of acoustic foams. J. Acoust. Soc. Am. 117, 1114-1121 (2005). Abstract Only.

Ahankari, S. S. & Kar, K. K. Hysteresis measurements and dynamic mechanical characterization of functionally graded natural rubber-carbon black composites. Polym. Eng. Sci. 50, 871-877 (2010). Abstract Only.

Shastry, V. V. Ramamurty, U. & Misra, A. Thermo-mechanical stability of a cellular assembly of carbon nanotubes in air. Carbon N. Y. 50, 4373-4378 (2012). Abstract Only.

Sanchez-Coronado, J. & Chung, D. D. L. Thermomechanical behavior of a graphite foam. Carbon N. Y. 41, 1175-1180 (2003).

Timsit, R. S. Electrical contact resistance: properties of stationary interfaces. IEEE Trans. Comp. Pack. Tech. 22, 85-98 (1999). Abstract Only.

Barnoss, S., Shanak, H., Bufon, C. C. B. & Heinzel, T. Piezoresistance in chemically synthesized polypyrrole thin films. Sensor Actuat. A-Phys. 154, 79-84 (2009).

Scilingo, E. P., Lorussi, F., Mazzoldi, A. & De Rossi, D. Strain-sensing fabrics for wearable kinaesthetic-like systems. IEEE Sensor. J. 3, 460-467 (2003).

Shobert, E. I. "Calculation of Electrical Contacts Under Ideal Conditions-Discussion." Proceedings-American Society for Testing and Materials. vol. 46. 100 Barr Harbor DR, W Conshohocken, PA 19428-2959: Amer Soc Testing Materials, 1946. Copy Not Readily Available.

Greenwood, J. A. & Williams, J. B. Contact of nominally flat surfaces. Proc. R. Soc. Lond. A 295, 300-319 (1966).

Archard, J. F. Elastic deformation and the laws of friction. Proc. R. Soc. Lond. A 243, 190-205 (1957).

Yu, Z. B., Niu, X. F., Liu, Z. & Pei, Q. B. "Intrinsically stretchable polymer light-emitting devices using carbon nanotubepolymer composite electrodes", Adv. Mater. 23, 3989-3994 (2011). Abstract Only.

Ilievski, F., Mazzeo, A. D., Shepherd, R. F., Chen, X. & Whitesides, G. M. "Soft robotics for chemists". Angew. Chem. Int. Ed. 50, 1890-1895 (2011).

Zhu and Xu "Buckling of Aligned Carbon Nanotubes as Stretchable Conductors: A New Manufacturing Strategy"; Adv. Mater. 2012, 24, 1073-1077.

Xu et al. "Wavy Ribbons of Carbon Nanotubes for Stretchable Conductors" Adv. Funct. Mater. 2012.

Akter et al. "Reversibly Stretchable Transparent Conductive Coatings of Spray-Deposited Silver Nanowires"; ACS Appl. Mater. Interfaces, 2012, 4 (4), pp. 1855-1859. Abstract Only.

Xu et al., "Highly Conductive and Stretchable Silver Nanowire Conductors"; Adv. Mater. 2012, 24, 5117-5122.

Kim et al., "Single-walled carbon nanotube/silicone rubber composites for compliant electrodes", SciVerse ScienceDirect, 2011.

Bergeron, "Stanford researchers build transparent, super-stretchy skin-like sensor", http://new.stanford.edu/pr/2011/pr-stretchy-skin-like-sensor-102411.html on Dec. 1, 2011.

Kendall, K. "Thin-film peeling-the elastic term." Journal of Physics D: Applied Physics 8.13 (1975): 1449-1452.

Kaltenbrunner, Martin, et al. "An ultra-lightweight design for imperceptible plastic electronics." Nature 499.7459 (2013): 458-463.

(56) References Cited

OTHER PUBLICATIONS

Webb, R. Chad, et al. "Ultrathin conformal devices for precise and continuous thermal characterization of human skin." (2013).
Salvatore, Giovanni A., et al. "Wafer-scale design of lightweight and transparent electronics that wraps around hairs." Nature communications 5 (2014). Abstract Only.
Lee, Sangmin, et al. "Ultrathin Nanogenerators as Self-Powered/ Active Skin Sensors for Tracking Eye Ball Motion." Adv. Funct. Mater 24 (2014): 1163-1168.
Hammock, Mallory L., et al. "25th Anniversary Article: The Evolution of Electronic Skin (E—Skin): A Brief History, Design Considerations, and Recent Progress." Advanced Materials 25.42 (2013): 5997-6038.
Wang, Chuan, et al. "User-interactive electronic skin for instantaneous pressure visualization." Nature materials 12.10 (2013): 899-904.
Kwak, Moon Kyu, Hoon-Eui Jeong, and Kahp Y. Suh. "Rational design and enhanced biocompatibility of a dry adhesive medical skin patch." Advanced Materials 23.34 (2011): 3949-3953.
Yang, Seung Yun, et al. "A bio-inspired swellable microneedle adhesive for mechanical interlocking with tissue." Nature 4 (1702): 2013.
Burrows, Malcolm, and Gregory Sutton. "Interacting gears synchronize propulsive leg movements in a jumping insect" science 341.6151 (2013): 1254-1256.
Casas, J., Steinmann, T. & Krijnen, G. Why do insects have such a high density of flow-sensing hairs? Insights from the hydromechanics of biomimetic MEMS sensors. J. R. Soc. Interface. 7, 1487-1495 (2010).
Pang, Changhyun, et al. "Bioinspired Reversible Interlocker Using Regularly Arrayed High Aspect—Ratio Polymer Fibers." Advanced Materials 24.4 (2012): 475-479. Abstract Only.
Lagarde, Marcia M. Mellado, et al. "Outer hair cell somatic, not hair bundle, motility is the basis of the cochlear amplifier." Nature neuroscience 11.7 (2008): 746-748.
Bélanger, M. and Marois, Y. (2001), Hemocompatibility, biocompatibility, inflammatory and in vivo studies of primary reference materials low-density polyethylene and polydimethylsiloxane: A review. J. Biomed. Mater. Res., 58: 467-477. doi: 10.1002/jbm.1043 Abstract Only.
Mittal, S. R., Sandeep Garg, and Mahesh Lalgarhia. "Jugular venous pressure and pulse wave form in the diagnosis of right ventricular infarction." International journal of cardiology 53.3 (1996): 253-256. Abstract.
Haji, Showkat A., and Assad Movahed. "Right ventricular infarction—diagnosis and treatment." Clinical cardiology 23.7 (2000): 473-482.
Devine, Patrick J., et al. "Jugular venous pulse: window into the right heart." Southern medical journal 100.10 (2007): 1022-7. Abstract Only.
Pang et al., "A flexible and highly sensitive strain-gauge sensor using reversible interlocking of nanofibres." (2012).
Pang, Changhyun, et al. "Analysis of preload-dependent reversible mechanical interlocking using beetle-inspired wing locking device." Langmuir 28.4 (2011): 2181-2188. Abstract Only.
Waddell, Tamara K., et al. "Carotid pressure is a better predictor of coronary artery disease severity than brachial pressure." Hypertension 38.4 (2001): 927-931.
Pauca, Alfredo L., et al. "Does radial artery pressure accurately reflect aortic pressure?." CHEST Journal 102.4 (1992): 1193-1198.
Ewy GA. The Abdominojugular Test: Technique and Hemodynamic Correlates. Ann Intern Med. 1988;109:456-460. doi:10.7326/0003-4819-109-6-456.
Eberlein B., et al. "Skin surface pH, stratum corneum hydration, trans-epidermal water loss and skin roughness related to atopic eczema and skin dryness in a population of primary school children: clinical report." Acta Dermatology-Venerology 80 (2000): 188-191.
Lee, Jessamine Ng, et al. "Compatibility of mammalian cells on surfaces of poly (dimethylsiloxane)." Langmuir 20.26 (2004): 11684-11691.
Craig, R. R. Mechanics of materials. (Wiley, 2011). Book Description and Table of Content Provided.
Conover, M. B. Understanding electrocardiography. (Mosby, 2002). Book Overview Provided.
Tafur, Emilio, Lawrence S. Cohen, and Harold D. Levine. "The Normal Apex Cardiogram Its Temporal Relationship to Electrical, Acoustic, and Mechanical Cardiac Events." Circulation 30.3 (1964): 381-391.
Pittman, James AL, John Sum Ping, and Jonathan B. Mark. "Arterial and central venous pressure monitoring." International anesthesiology clinics 42.1 (2004): 13-30.
Mannsfeld et al. "Highly sensitive flexible pressure sensors with microstructured rubber dielectric layers." (2010).
Tee, Benjamin C-K, et al. "Tunable Flexible Pressure Sensors using Microstructured Elastomer Geometries for Intuitive Electronics." Advanced Functional Materials 24.34 (2014): 5427-5434.
Park, S., et al. "Stretchable energy-harvesting tactile electronic skin capable of differentiating multiple mechanical stimuli modes." Advanced materials (Deerfield Beach, Fla.) 26.43 (2014): 7324-7332. Abstract Only.
Wang, Xuewen, et al. "Silk—Molded Flexible, Ultrasensitive, and Highly Stable Electronic Skin for Monitoring Human Physiological Signals." Advanced Materials 26.9 (2014): 1336-1342.
Ko H., et al.,"Multifunctional, flexible electronic systems based on engineered nanostructured materials," Nanotechnology 23 (2012).
Dahiya, Ravinder S., et al. "Tactile sensing—from humans to humanoids." Robotics, IEEE Transactions on 26.1 (2010): 1-20.
Pang, Changhyun, Chanseok Lee, and Kahp—Yang Suh. "Recent advances in flexible sensors for wearable and implantable devices." Journal of Applied Polymer Science 130.3 (2013): 1429-1441.
Takahashi, Toshitake, et al. "Carbon nanotube active-matrix backplanes for conformal electronics and sensors." Nano letters 11.12 (2011): 5408-5413.
Lee, Hyung-Kew, Sun-Il Chang, and Euisik Yoon. "A flexible polymer tactile sensor: Fabrication and modular expandability for large area deployment." Microelectromechanical Systems, Journal of 15.6 (2006): 1681-1686.
Cheng, M. Y., et al. "A flexible capacitive tactile sensing array with floating electrodes." Journal of Micromechanics and Microengineering 19.11 (2009): 115001.
Gong, Shu, et al. "A wearable and highly sensitive pressure sensor with ultrathin gold nanowires." Nature communications 5 (2014). Abstract Only.
Pan, Lijia, et al. "An ultra-sensitive resistive pressure sensor based on hollow-sphere microstructure induced elasticity in conducting polymer film." Nature communications 5 (2014).
Greenwood, J. A. Constriction resistance and the real area of contact. Br. J. Appl. Phys. 17, 1621-1632 (1966).
Lau, Y. Y. & Tang, W. A higher dimensional theory of electrical contact resistance. J. Appl. Phys. 105, 124902 (2009). Abstract Only.
Gomez, M. R. et al. Experimental validation of a higher dimensional theory of electrical contact resistance. Appl. Phys. Lett. 95, 072103 (2009).
Zhang, P. & Lau, Y. Y. Scaling laws for electrical contact resistance with dissimilar materials. J. Appl. Phys. 108, 044914 (2010).
Zhang, P., Lau, Y. Y. & Gilgenbach, R. M. Thin film contact resistance with dissimilar materials. J. Appl. Phys. 109, 124910 (2011).
Lam, Y. Z., Swingler, J. & McBride, J. W. The contact resistance force relationship of an intrinsically conducting polymer interface. IEEE Trans. Comp. Pack. Tech. 29, 294-302 (2006).
Liu, W., Menciassi, A., Scapellato, S., Dario, P. & Chen, Y. A biomimetic sensor for a crawling minirobot. Robot. Auton. Syst. 54, 513-528 (2006).
Oh, K. W., Park, H. J. & Kim, S. H. Electrical property and stability of electrochemically synthesized polypyrrole films. J. Appl. Polym. Sci. 91, 3659-3666 (2004).
Li, Y. et al. A flexible strain sensor from polypyrrole-coated fabrics. Synthetic Met. 155, 89-94 (2005). Abstract Only.
Jiang, M. J., Dang, Z. M. & Xu, H. P. Significant temperature and pressure sensitivities of electrical properties in chemically modified

(56) References Cited

OTHER PUBLICATIONS multiwall carbon nanotube/methylvinyl silicone rubber nanocomposites. Appl. Phys. Lett. 89, 182902 (2006). Abstract Only.
de la Vega, A., Sumfleth, J., Wittich, H. & Schulte, K. Time and temperature dependent piezoresistance of carbon nanofiller/polymer composites under dynamic load. J. Mater. Sci. 47, 2648-2657 (2012). Abstract Only.
Wu, J., Zhou, D., Too, C. O. &Wallace, G. G. Conducting polymer coated lycra. Synthetic Met. 155, 698-701 (2005). Abstract Only.
Ochoteco, E. et al. All-plastic distributed pressure sensors: taylor-made performance by electroactive materials design. Microsyst. Technol. 14, 1089-1097 (2008) Abstract Only.
Papakostas, Thomas V., Julian Lima, and Mark Lowe. "A large area force sensor for smart skin applications." Sensors, 2002. Proceedings of IEEE. vol. 2. IEEE, 2002.
King, M. G., et al. "Porous PDMS force sensitive resistors." Procedia Chemistry 1.1 (2009): 568-571.
Rizvi, Reza, and Hani Naguib. "Porosity and composition dependence on electrical and piezoresistive properties of thermoplastic polyurethane nanocomposites." Journal of Materials Research 28.17 (2013): 2415-2425.
Weiβ, Karsten, and Heinz Wörn. "The working principle of resistive tactile sensor cells." Mechatronics and Automation, 2005 IEEE International Conference. vol. 1. IEEE, 2005.
Kuang, Jun, et al. "A hierarchically structured graphene foam and its potential as a large-scale strain-gauge sensor." Nanoscale 5.24 (2013): 12171-12177.
Jackman, R. J., Duffy, D. C., Cherniayskaya, O. & Whitesides, G. M. "Using elastomeric membranes as dry resists and for dry lift-off". Langmuir 15, 2973-2984 (1999).
Tombler, T.W., et al. "Reversible electromechanical characteristics of carbon nanotubes under local-probe manipulation". Nature 405, 769-772 (2000).
Jones, J., Lacour, S. P., Wagner, S. & Suo, Z. G. "Stretchable wavy metal interconnects". J. Vac. Sci. Technol. A 22, 1723-1725 (2004).
Bekyarova, E. et al. "Electronic properties of single-walled carbon nanotube networks". J. Am. Chem. Soc 127, 5990-5995 (2005). Abstract Only.
Someya, T. et al. "Conformable, flexible, large-area networks of pressure and thermal sensors with organic transistor active matrixes". Proc. Natl Acad. Sci. USA 102, 12321-12325 (2005).
Nosho, Y., Ohno, Y., Kishimoto, S. & Mizutani, T. "The effects of chemical doping with F(4)TCNQ in carbon nanotube field-effect transistors studied by the transmission-line-model technique". Nanotechnology 18, 415202 (2007).
Khang, D. Y. et al. Molecular scale buckling mechanics in individual aligned single-wall carbon nanotubes on elastomeric substrates. Nano Lett. 8, 124-130 (2008).
LeMieux, M. C. & Bao, Z. N. "Flexible electronics: stretching our imagination". Nature Nanotech. 3, 585-586 (2008). Abstract Only.
Dickey, M. D. et al. "Eutectic gallium-indium (EGaIn): a liquid metal alloy for the formation of stable structures in microchannels at room temperature". Adv. Funct. Mater. 18, 1097-1104 (2008).
Ko, H. C. et al. "A hemispherical electronic eye camera based on compressible silicon optoelectronics". Nature 454, 748-753 (2008).
Cotton, D. P. J., Graz, I. M. & Lacour, S. P. "A multifunctional capacitive sensor for stretchable electronic skins". IEEE Sens. J. 9, 2008-2009 (2009).
Sekitani, T. et al. "Stretchable active-matrix organic light-emitting diode display using printable elastic conductors". Nature Mater. 8, 494-499 (2009).
Graz, I. M., Cotton, D. P. J. & Lacour, S. P. "Extended cyclic uniaxial loading of stretchable gold thin-films on elastomeric substrates". Appl. Phys. Lett. 98, 071902 (2009). Abstract Only.
Tahk, D., Lee, H. H. & Khang, D. Y. "Elastic moduli of organic electronic materials by the buckling method". Macromolecules 42, 7079-7083 (2009). Abstract Only.
Kim, K. S. et al. "Large-scale pattern growth of graphene films for stretchable transparent electrodes". Nature 457, 706-710 (2009).
Avouris, P. "Carbon nanotube electronics and photonics". Phys. Today 62, 34-40 (2009).
Hu, L. B., Yuan, W., Brochu, P., Gruner, G. & Pei, Q. B. "Highly stretchable, conductive, and transparent nanotube thin films". Appl. Phys. Lett. 94, 161108 (2009). Abstract Only.
Yu, C. J., Masarapu, C., Rong, J. P., Wei, B. Q. & Jiang, H. Q. "Stretchable supercapacitors based on buckled single-walled carbon nanotube macrofilms", Adv. Mater. 21, 4793-4797 (2009).
Cao, Q. & Rogers, J. A. "Ultrathin films of single-walled carbon nanotubes for electronics and sensors: a review of fundamental and applied aspects". Adv. Mater. 21, 29-53 (2009).
So, J. H. et al. "Reversibly deformable and mechanically tunable fluidic antennas", Adv. Funct. Mater. 19, 3632-3637 (2009).
Roberts, M. E., Sokolov, A. N. & Bao, Z. N. "Material and device considerations for organic thin-film transistor sensors". J. Mater. Chem. 19, 3351-3363 (2009). Abstract Only.
Bae, S. et al. "Roll-to-roll production of 30-inch graphene films for transparent electrodes", Nature Nanotech. 5, 574-578 (2010).
Feng, C. et al. "Flexible, stretchable, transparent conducting films made from superaligned carbon nanotubes". Adv. Funct. Mater. 20, 885-891 (2010). Abstract Only.
Kim, B. Y. S., Rutka, J. T. & Chan, W. C. W. "Current concepts: nanomedicine". New Engl. J. Med. 363, 2434-2443 (2010).
Kim, D. H. et al. "Dissolvable films of silk fibroin for ultrathin conformal biointegrated electronics". Nature Mater. 9, 511-517 (2010).
Kim, R. H. et al. "Waterproof AIInGaP optoelectronics on stretchable substrates with applications in biomedicine and robotics". Nature Mater. 9, 929-937 (2010). Abstract Only.
Viventi, J. et al. "A conformal, bio-interfaced class of silicon electronics for mapping cardiac electrophysiology". Sci. Transl. Med. 2, 24ra22 (2010).
Zhang, Y. Y. et al. "Polymer-embedded carbon nanotube ribbons for stretchable conductors". Adv. Mater. 22, 3027-3031 (2010).
Hu, L. B., Hecht, D. S. & Gruner, G. "Carbon nanotube thin films: fabrication, properties, and applications". Chem. Rev. 110, 5790-5844 (2010). Book Table of Contents Only.
Kubo, M. et al. "Stretchable microfluidic radiofrequency antennas". Adv. Mater. 22, 2749-2752 (2010).
Chun, K. Y. et al. "Highly conductive, printable and stretchable composite films of carbon nanotubes and silver". Nature Nanotech. 5, 853-857 (2010).
Lipomi, D. J., Tee, B. C.-K., Vosgueritchian, M. & Bao, Z. N. "Stretchable organic solar cells". Adv. Mater. 23, 1771-1775 (2011). Abstract Only.

\* cited by examiner

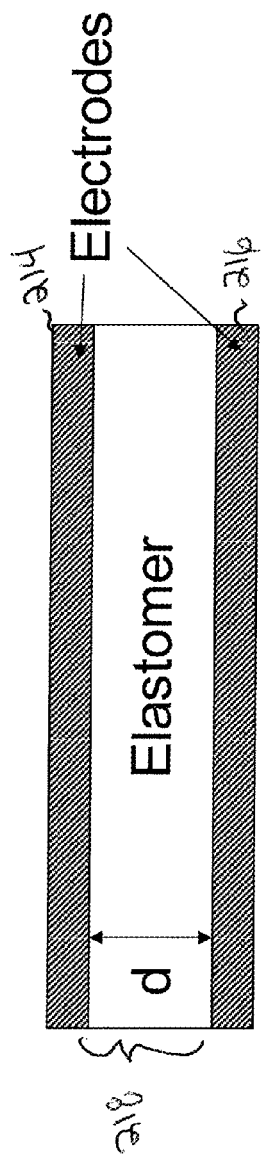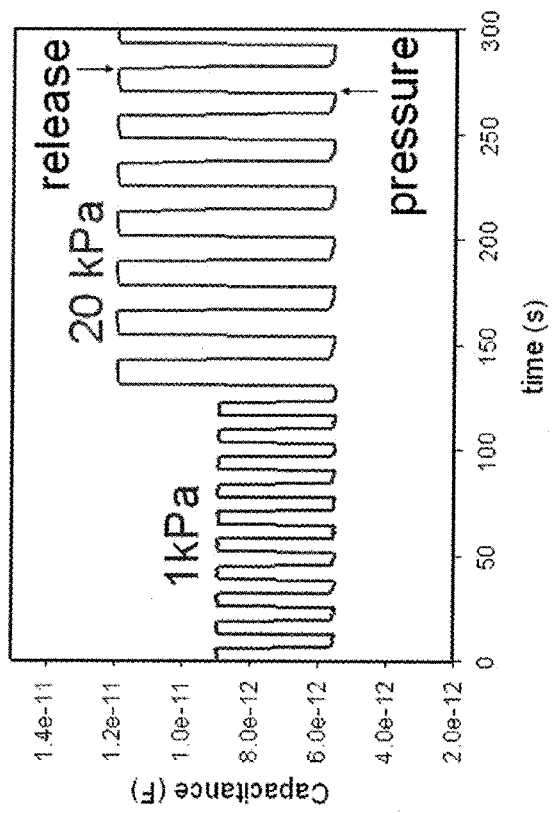
FIG. 2A
FIG. 2B

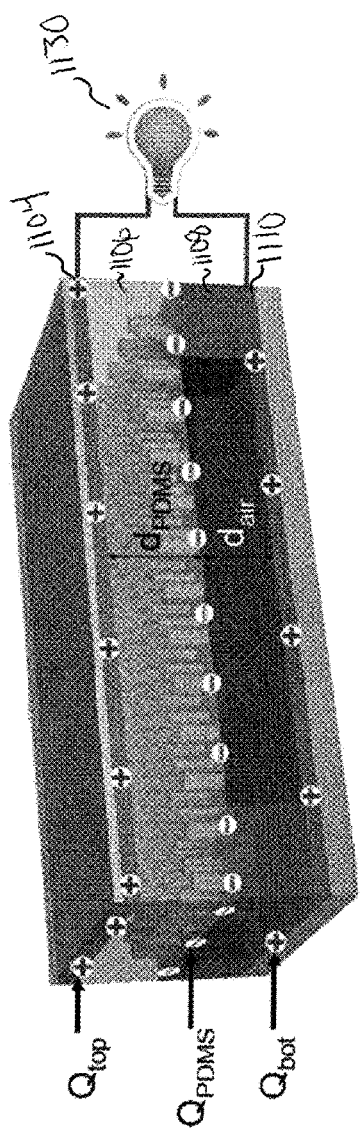
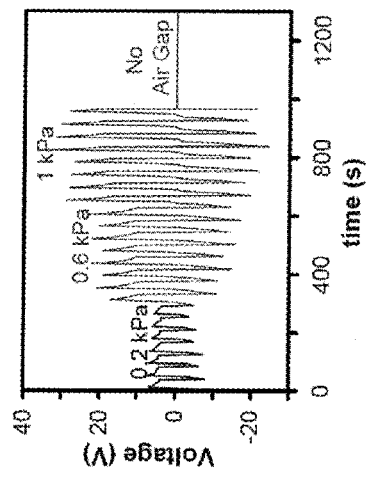
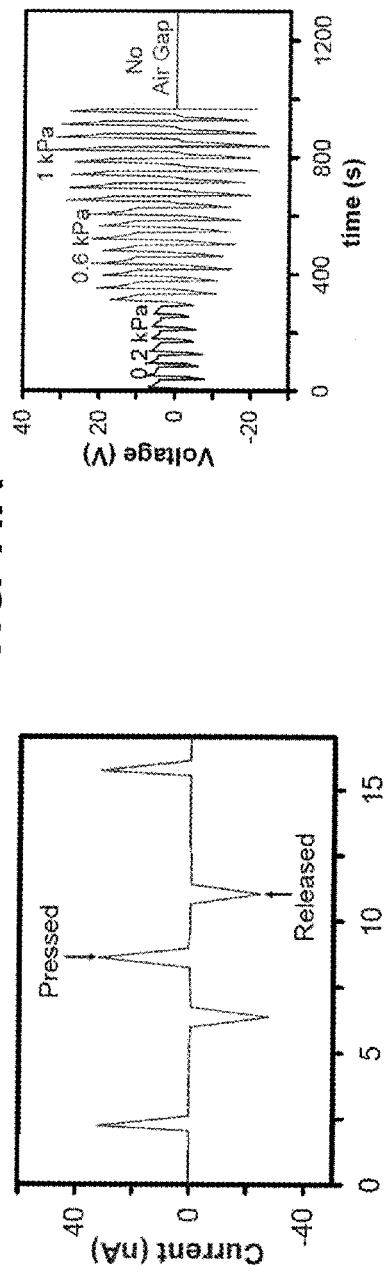
FIG. 11A
FIG. 11B
FIG. 11C

METHODS AND APPARATUS CONCERNING MULTI-TACTILE SENSITIVE (E-SKIN) PRESSURE SENSORS

RELATED DOCUMENTS

This patent document claims benefit under 35 U.S.C. §119 of U.S. Provisional Patent Application Ser. No. 62/032,233, entitled "Stretchable, Energy-Harvesting Electronic Skin Devices, Tactile Sensors and Methods Therefor" and filed on Aug. 1, 2014, and with two Appendices; this provisional patent document and its appendices are fully incorporated herein by reference.

BACKGROUND

For a wide variety of applications, significant research has been directed to approaches for sensing various forms of pressure. This research has been largely driven by a growing market for pressure-responsive electronic devices.

There are many different types of pressure sensing technologies. Many of these devices are limited in application. For example, many pressure sensors are not flexible and cannot be implemented on curved surfaces. In addition, many sensors cannot be implemented in certain environments, such as environments susceptible to moisture. Further, many sensors are difficult and/or expensive to manufacture, and are not readily implemented in compact arrangements.

These and other characteristics have presented challenges to the implementation of sensors for a variety of applications, and have exhibited limited sensitivity.

SUMMARY

Aspects of the present disclosure are directed to a variety of different types of apparatus, systems, and arranged involving tactile sensing (e.g., multi-stimuli sensing) and electronic skin pressure sensors. Specific embodiments are believed to be particularly advantageous for tactile sensing electronic applications which are realized as a stretchable pressure sensor capable of sensing, differentiating, and/or generating energy from various mechanical stimuli as self-sustainable power source.

Specific aspects of the present disclosure are applicable for tactile sensing, health monitoring, and temperature sensing. Consistent with these aspects, sensor embodiments of the present disclosure are able to convert mechanical stimuli into signals, which are then interpreted as beneficial to the particular application. In a number of aspects, the electronic pressure sensors can differentiate between different mechanical stimuli. The different mechanical stimuli can include normal pressure, bending, and lateral stress demonstrated by simultaneously measuring the change in capacitance and the change in film resistance due to lateral stress. In other related aspects, the electronic skin pressure sensors can generate energy in response to mechanical stimuli, which can be harvested. For example, in some detailed/experimental embodiments, an electronic skin pressure sensor, responsive to mechanical stimuli, can generate power in the tens of microwatt ($\mu$W)/centimeter (cm)$^2$ from a gentle finger touch. Further, the electronic skin pressure sensors described herein have applications in technologies such as, but not limited to, robotics, prosthetics, hand-held devices, touch screen devices, as well as applications in physiological signal monitoring and healthcare.

Consistent with the above, various aspects of the instant disclosure are directed to the following methods and apparatuses.

Certain aspects of the instant disclosure involve an apparatus comprising an electronic-skin pressure sensor configured and arranged for differentiating between different mechanical stimuli including lateral stress and at least one additional mechanical stimuli. The at least one additional mechanical stimuli, in accordance with various aspects, includes mechanical stimuli selected from the group consisting of pressure, bending, flexing, and a combination thereof. The apparatus includes sensor circuitry configured and arranged to respond to the electronic skin pressure sensor by sensing a change in impedance due to the lateral stress.

Consistent with various aspects of the present disclosure, the apparatus comprises an electronic skin pressure sensor including circuitry configured and arranged to differentiate between different mechanical stimuli by outputting a signal indicative of pressure, the different mechanical stimuli including lateral stress and a mechanical stimuli selected from the group consisting of: pressure, bending, flexing, and a combination thereof. The sensor circuitry is configured and arranged to respond to the electronic skin pressure sensor by collecting energy ensuing from a change in film-impedance due to the lateral stress.

Various other embodiments of the present disclosure are directed to an apparatus comprising an electronic skin pressure configured for differentiating between different mechanical stimuli including lateral stress and a mechanical stimuli selected from the group consisting of pressure, bending and flexing, and a combination thereof. The sensor circuitry is configured and arranged to respond to the electronic skin pressure sensor by collecting, measuring and harvesting energy ensuing from a change in film-impedance due to the lateral stress.

Other related aspects of the present disclosure are directed to a method of using an apparatus as described above. For example, the method includes providing output signals indicative of pressure applied using an electronic skin pressure sensor, and differentiating between different mechanical stimuli including lateral stress and mechanical stimuli selected from the group consisting of pressure, bending, flexing, and a combination thereof, in response to the output signals. Further, the method includes sensing a change in impedance due to the lateral stress using sensor circuitry and collecting energy ensuing from a change in impedance due to the lateral stress.

In various embodiments, the method can include using energy ensuing therefrom, using the sensor circuitry, for supplementing a power source of a load in the form of an electrical circuit. Alternatively and/or in addition, the method can include storing the energy using a storage circuit. The storage circuit can include a supercapacitor, a stretchable supercapacitor, and a rechargeable battery.

As should be apparent in the present disclosure, the electronic skin pressure sensor can also distinguish stress and local pressure, and both lateral and vertical stress. The sensor circuitry can also respond to the lateral stress by using energy ensuing therefrom for supplementing a power source of a load in the form of an electronic circuit.

Further aspects of the present disclosure are directed toward apparatuses and methods for flexible tactile sensing devices and electronic skin devices that consume power, at least in part, by harvesting energy. Such energy may be harvested by a change in film-impedance due to lateral stress. The herein-described electronic pressure sensors and apparatuses are configured and arranged to assess and/or differentiate quality levels of input signals received by the devices. The flexible electronic devices and systems can include a chargeable polydimethylsiloxane (PDMS) porous surface for interfacing with a user's skin and/or with microstructures to enhance pressure sensing sensitivity.

Certain other embodiments of the present disclosure and the stretchable electronic skin pressure sensors and tactile sensor systems described herein include energy storage elements such as, but not limited to, supercapacitors, stretchable supercapacitors, and rechargeable batteries. Other embodiments of the instant disclosure include nanostructures, such as carbon nanotubes and/or silver nanostructures, configured and arranged to enable or facilitate stretchability attributes of the apparatuses and/or stretchable electronic devices. For example, aspects of the present disclosure can include a stretchable electronic device that is configured and arranged for and/or used to assess and/or differentiate quality levels, of input signals received by the device, for one or more applications of the stretchable electronic device.

DESCRIPTION OF THE FIGURES

Various example embodiments may be more completely understood in consideration of the following detailed description in connection with the accompanying drawings, in which:

FIGS. 2A-2B illustrate an example of using an electronic skin pressure sensor to detect pressure in accordance with various embodiments;

FIGS. 11A-11C illustrate an example electronic skin pressure sensor and sensor circuitry configured to collect, measure, and/or harvest energy ensuring from a change in impedance due to the mechanical stimuli of lateral stress in accordance with various embodiments;

Figure 1A:
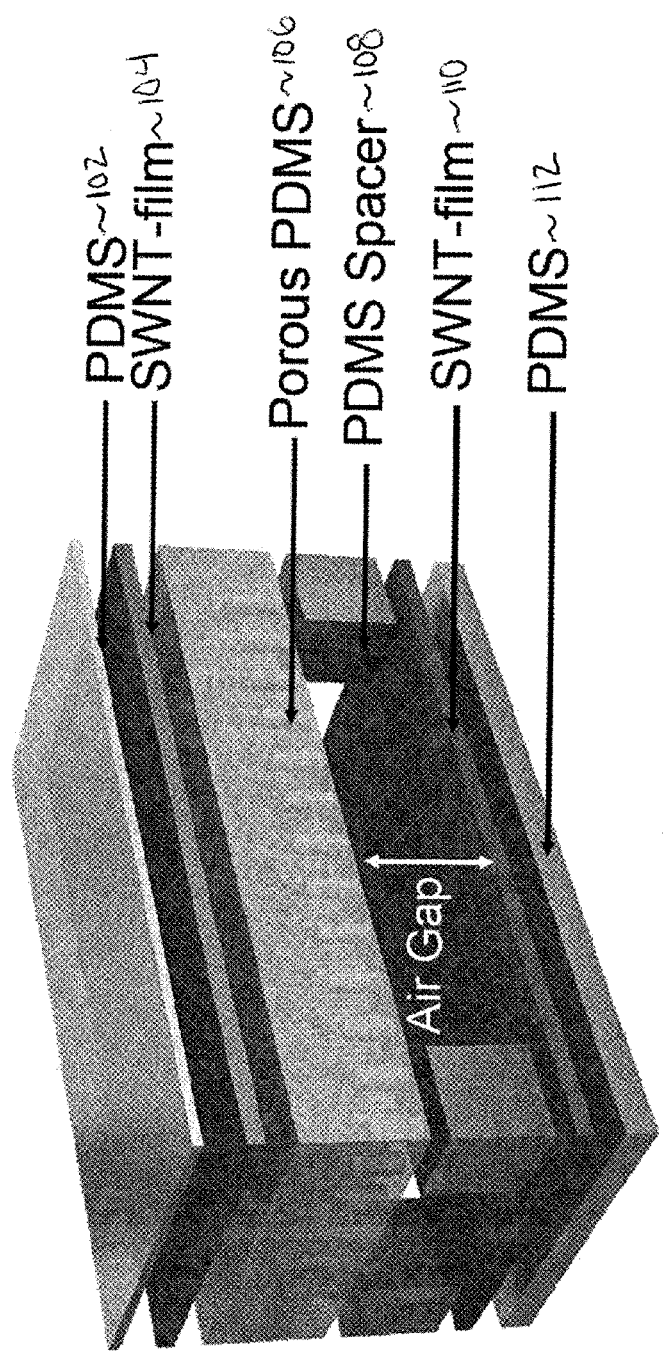
FIGS. 1A-1B show an example electronic skin pressure sensor in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and arrangements involving tactile sensing and electronic skin pressure sensors, and which can distinguish from different mechanical stimuli. In certain implementations, aspects of the present disclosure have been shown to be particularly beneficial when used in the context of collecting, harvesting, and/or storing energy ensuing from exposure to the mechanical stimuli. While not necessarily so limited, various aspects may be appreciated through a discussion of examples using such exemplary contexts.

As with the remarkable network of sensitive diverse sensors provided by human skin, specific aspects of the present disclosure are applicable for tactile sensing and health monitoring. Consistent with these aspects, sensor embodiments of the present disclosure are able to convert mechanical stimuli into signals, which are then interpreted as beneficial to the particular application. As with human skin, certain aspects of the present disclosure are directed to electronic skin pressure sensors which mimic properties of human skin using surface-interfacing structures which are integrated with electronics (i.e., electronic circuitry). This system has a range of applications, such as prosthetics, robotics with human-like functionalities (humanoids), and continuous health monitoring.

To mimic the properties of human skin, an electronic skin pressure sensor in accordance with the present disclosure has an appropriate range of tactile sensitivity and can distinguish a variety of mechanical stimuli, such as normal pressure, lateral stress, and bending. Distinguishing between mechanical stimuli can allow for object manipulation, grasp control, and/or texture determination. Further, electronic skin pressure sensors can be stretchable. Stretchability can be useful for placing an electronic skin pressure sensor conformably on arbitrarily curved and moving surfaces such as joints, and for it to withstand repeated and prolonged mechanical stresses of various kinds such as bending and twisting.

Surprisingly, as further described herein, electronic skin pressure sensors in accordance with the present disclosure provide application-specific appropriate pressure and stress sensitivity, intrinsic stretchability, and the capability to distinguish between various tactile information. To differentiate between various tactile information such as normal pressure, stress, and bending, the stretchability of the pressure sensor can be used to simultaneously measure the change in capacitance and film resistance due to lateral stress. Lateral stress, as used herein, includes lateral strain or lateral tension, or both lateral strain and lateral tension. In example detailed/experimental embodiments, the electronic skin pressure sensors have demonstrated a high pressure sensitivity, for example, average and maximum of 0.7 $kPa^{-1}$ and 1.5 $kPa^{-1}$ in the pressure region <1 kPa.

Other related aspects of the present disclosure are directed to a stretchable energy harvesting electronic skin pressure sensor that is surprisingly able to detect, differentiate, and harvest a variety of mechanical stimuli, due to the stretchability of the pressure sensor and a pressure sensor architecture. In various embodiments, an electronic skin pressure sensor includes an embedded stretchable power source (e.g., a supplied self-sustainable power that may negate the need to periodically replace the power source). The energy can be generated and/or harvested from exposing the electronic skin pressure sensor to mechanical stimuli. Electronic skin pressure sensors can be under constant and/or periodic mechanical stimuli of various kinds during operation and can generate energy that can be harvested in response to the mechanical stimuli. These features render example electronic skin pressure sensors useful for a variety of electronic skin applications where conformable adherence to moving surfaces, tactile sensing, and self-sustainable power is used, and which mimicking the properties and capabilities of human skin.

Embodiments in accordance with the present disclosure include an apparatus that includes an electronic skin pressure sensor configured and arranged for differentiating between different mechanical stimuli including lateral stress and at least one of pressure, bending and flexing. The apparatus further includes sensor circuitry configured to respond to the electronic skin pressure sensor by sensing a change in impedance due to the lateral stress. The sensor pressure can include a circuit with an organic semiconductor substrate and/or other semiconductor material such as inorganic nanowires which are also flexible. For example, the circuit of the pressure sensor can provide an output based on pressure applied to the pressure sensor. The output can be indicative of an impedance, pressure applied, and/or a location of the pressure applied. The circuit can include a first and second electrode and a dielectric region. For example, the first and second electrodes can be formed of nanostructures, such as a carbon-nanotube film. The dielectric region can be located between the electrodes and can be formed of silicon, such as a porous PDMS layer, and a gap region. The material and/or regions forming the dielectric region can deform in response to pressure, resulting in an electrical characteristic (e.g., impedance) at one of the electrodes which can be used as a pressure indication via a related change in dielectric properties of the dielectric region. The sensor circuitry can respond to the electronic skin pressure sensor by processing the output from the electrode to provide a change in impedance due to the lateral stress. For example, the change in impedance can include a change in capacitance, a change in film-resistance of the first electrode, and a change in film-resistance of the second electrode.

Certain embodiments implement electronic skin pressure sensors, in accordance with the present disclosure, to include a plurality of layers of different material. For example, the different layers can include silicon, nanostructures, porous silicon, and/or a gap region formed by silicon blocks. In various embodiments, a layer of nanostructures, such as carbon nanotubes, can form each opposing electrode of the electronic pressure sensor. A layer of porous silicon and the gap region can be between the layers of nanostructures and can act as a dielectric region. The nanostructures can, for instance, facilitate stretchability of the apparatus. Further, the interaction of the silicon layer with the nanostructure layer can create energy from a change in the film-impedance due to the lateral stress, as further discussed herein.

Other aspects of the present disclosure are directed toward apparatuses and methods involving at least one sensor implemented consistent with one or more of the above sensor types, in which the apparatus involves at least one of: a prosthetics device in which the sensor provides an output for operating the prosthetics device; a robotics device in which the sensor provides an output for facilitating automatic movement of the robotics device; and a medical device for insertion into a subject, in which the sensor provides an output for detecting pressure in the subject corresponding to pressure applied to one of the sensors.

Other related aspects are directed to electronic skin that can be used in artificial intelligence devices that come in-to direct contact with humans, and in biomedical applications such as prosthetic skin. In order to mimic the tactile sensing properties of natural skin, large arrays of sensors as discussed herein are formed on a flexible and stretchable substrate, such as by using the biocompatible elastomer PDMS.

According to other aspects, in addition to displays, certain embodiments consistent with the instant disclosure use three-dimensional touch sensors on or as part of surfaces of input devices, which may include curved surfaces. Such devices include, for example, a computer mouse, rollable keyboards, or a gaming interface device. In some implementations, the sensors operate to replace mechanically-moving components such as buttons, and may be configured to provide an output corresponding to such components.

Another related example aspect is directed to the detection and prevention of excessive pressure on body tissue, such as during insertion of medical or surgical devices or cameras, using a flexible bio-neutral pressure sensor (e.g., near the tip of an instrument such as a camera head). This pressure sensitivity effectively gives feedback to the operator in a manner akin, for example, to sensing pressure on one's own skin.

In other related aspects, postoperative or post traumatic organ or tissue swelling is detected and monitored with a flexible bio-compatible pressure sensor patch using a pressure sensing device as discussed herein. The sensor patch may, for example, be further coupled to a small bio-compatible radio frequency identification (RFID) device, which communicates pressure characteristics using wireless communications.

Power for the sensors as discussed herein can be obtained in a variety of manners. In some implementations, an external power supply or a battery are used. In other implementations, wireless power devices such as radio frequency devices that draw power from wireless signals are implemented with the sensors and used to power the sensors. In still other implementations, structuring is applied to piezoelectric films and a piezoelectric voltage that results from the exertion of pressure on the device powers the device.

Sensors as discussed herein may be implemented in a variety of applications. For example, one such application includes touch screen devices such as hand-held devices, televisions and computer devices, in which the sensor passes light (e.g., using a transparent elastomer material such as PDMS). Other applications are directed to force-sensing methods, such as resistive pressure sensors using conductive filler particles in elastomers, or quantum tunneling composites. Certain applications are directed to sensing changes in pressure, such as may be exhibited in a pressure vessel upon the development of a leak (e.g., a loss in pressure can be detected as a change in conductivity due to dielectric changes). Certain embodiments of the present disclosure are directed to sensing devices, wherein at least one sensor includes an elastic dielectric that is configured to exhibit an impedance change due to elastic capacitance (e.g., elastic capacitor as a discrete element or part of a capacitive circuit).

Other related aspects are directed to medical applications, such as for sensing pressure within a body, or for prosthetic devices. Still other applications are directed to detecting pressure exerted on surfaces, such as by wind on a car or airplane body, and related deformations therein (e.g., to monitor for material stress), and can be used to understand frictional forces exerted by fluids (e.g., using a multi-sensor approach as discussed herein). Other aspects involve sensing pressure in highly curved surfaces, such as in tubes that flow gasses and/or liquids, or in pressure vessels. Other applications are directed to portable, highly sensitive weighing scales, low fluid flow rate sensors, underwater touch sensors, pressure sensing systems for detecting driver fatigue by detecting low periods of low-pressure (or no pressure) contact forces on curved surfaces of steering wheels during vehicle motion, and strain gauges (e.g., between movable joints).

Sensors, as discussed in connection with one or more example embodiments, can be manufactured using a variety of approaches, and can be implemented in a variety of applications. In some embodiments, a sensor is manufactured on plastic substrates in a roll-to-roll process, which allows for high throughput and thus facilitates low commercialization costs. Accordingly, an elastomeric type roll can be manufactured with pressure-sensing electrodes in high-speed, facilitating the rapid manufacture of devices. Such sensors made on flexible substrates can be implemented with a variety of applications, such as curvilinear surface applications. The pressure sensors can include resistive pressure sensors or capacitive pressure sensors. In various embodiments, the sensor device optionally includes circuitry including a wireless transmitter.

Figure 1B:
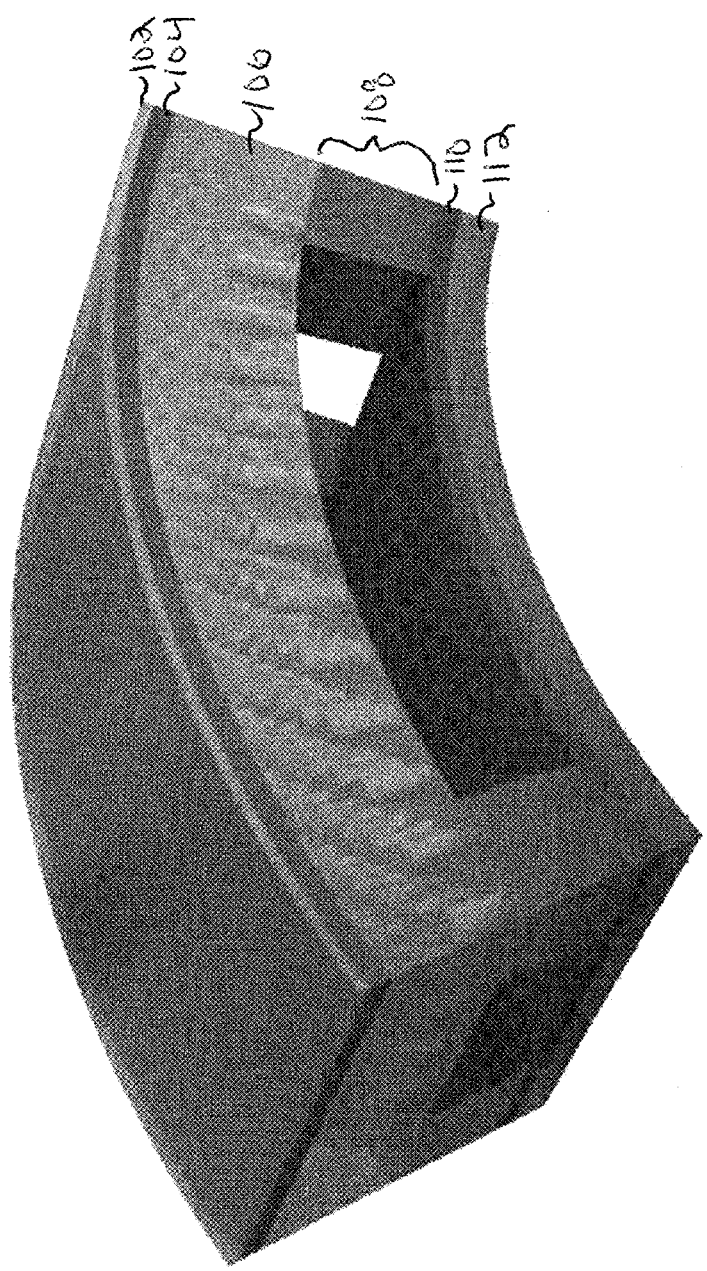

Turning now to the figures, FIGS. 1A-1B show an example electronic skin pressure sensor in accordance with various embodiments. The electronic skin pressure sensor is capable of differentiating between different mechanical stimuli including lateral stress and at least one of pressure, bending, and flexing.

FIG. 1A illustrates a schematic depiction of the electronic skin pressure sensor in a layer by layer format in accordance with various embodiments. An electronic skin pressure sensor can include circuitry with an organic semiconductor substrate and/or other semiconductor material such as inorganic nanowires which are also flexible. The circuitry can be configured to differentiate between the different mechanical stimuli by measuring pressure. For example, the circuitry of the pressure sensor can provide an output based on pressure applied to the pressure sensor. The output can be indicative of an impedance, pressure applied, and/or a location of the pressure applied.

The circuitry can include a first electrode, a second electrode, and a dielectric region. For example, the first and second electrodes can be opposing electrodes formed of nanostructures, such as a carbon-nanotube film. The dielectric region can be located between the electrodes and can be formed of silicon, such as a porous silicon material and a gap region formed by at least two silicon blocks. The dielectric region can deform in response to different mechanical stimuli applied to the electronic skin pressure sensor. In response to the deformation of the dielectric region, the first and/or second electrode provide an electrical characteristic indicative of a respective mechanical stimuli. The electrical characteristic can include an impedance. For example, the material and/or regions forming the dielectric region can deform in response to pressure, resulting in an electrical characteristic at one of the electrodes which can be used as a pressure indication via a related change in dielectric properties of the dielectric region. That is, as the dielectric region is compressed (or expanded) due to an applied pressure (increasing or decreasing pressure), an electrical characteristic at the one of the electrodes (e.g., SWNT-film) can be used as an indication of this compression via a related change in dielectric properties of the dielectric regions and/or an effective dielectric constant of the entire dielectric layer.

In various embodiments, the electronic skin pressure sensor includes circuitry that processes an output at one of the respective electrodes to provide an indication of pressure applied to the dielectric layer (e.g., as pressure applied to the upper electrode, with the lower electrode being held stationary). A sensor circuitry can respond to the electronic skin pressure sensor by processing the output from the circuitry of the pressure sensor to provide a change in impedance due to the lateral stress. For general and specific information regarding pressure sensors including such output/processing circuitry, reference is made to K. Hyunhyub, R. Kapadia, K. Takie, T. Takahasi, X. Zhang, and A. Javey, *Multi-functional, flexible electronic systems based on engineered nanostructured materials*, Nanotechnology 23 (2012), and referenced in the underlying provisional application as Appendix B, which is fully incorporated herein by reference.

As a specific example, such output/processing circuitry is implemented by replicating such e-skin pressure sensors in an array and using field-effect transistor (FET)-based circuitry to modulate an on-state conductance of the FETs by conductance change of the electronic skin pressure sensor when external stimuli is applied. The FET-based circuitry can include an array of FETs integrated into pressure-sensitive rubber. The source of each FET can be connected to ground through the pressure-sensitive rubber. In some embodiments, logic circuitry and/or central processing unit (CPU) can be programmed to process the outputs from the electronic skin pressure sensor, for example by, measuring and/or sensing the impedance. In some aspects, the impedance can be measured and/or sensed by the charge on the opposing electrodes as enhanced by the dielectric constant and divided by the distance between the opposing electrodes, such as discussed by Equation 1 (e.g., capacitance). In other related aspects, the impedance can be measured and/or sensed by the length of the SWNT film divided by the width of the SWNT film multiplied by a resistivity value of the SWNT film, as discussed by Equation 2 (e.g., film resistance).

For example, the change in impedance can include a change in capacitance, a change in film-resistance of the first electrode, and a change in film-resistance of the second electrode. The change in capacitance in the structured film arises from the reduction in the distance between the two electrodes, and this is enhanced by the increase in dielectric constant. The change in resistance is further described herein. In some implementations, the sensor circuitry, including a processor, uses the indication of pressure to carry out processing tasks, such as sensing and/or determining a change in impedance.

An electronic skin pressure sensor, in accordance with various embodiments, consist of (e.g., top to bottom of FIG. 1A) multiple layers of different material. For example, the various layers can include silicon, nanostructures, porous silicon, and a gap region created by silicon blocks. The silicon layer, porous silicon layer, and/or silicon blocks can include a silicon-based organic polymer, such as polydimethylsiloxane (PDMS). The porous silicon layer can include microstructures within the silicon material. Such microstructures can create pores within the silicon material, resulting in a porous silicon layer. The microstructures (e.g., pores) can be equally spaced, randomly spaced, differently spaced, same and/or different sizes or shapes. The nanostructure layers, in various embodiments, can include carbon nanotubes, such as single-walled carbon nanotubes (SWNTs), or multi-walled carbon nanotubes (MWNTs). The gap region can be an air gap formed by silicon blocks, in accordance with various embodiments. The porous silicon layer (e.g., porous PDMS surface) can enhance the pressure sensing sensitivity and the nanostructures can facilitate stretchability attributes of apparatus, as further illustrated herein. Additionally, at least one of the silicon layers can be a chargeable PDMS surface for interfacing with a user's skin.

For example, in some aspects of the present disclosure, the electronic skin pressure sensor is formed of a first layer of PDMS 102, a second layer of SWNT-film 104, a third layer of porous PDMS 106, a fourth layer of PDMS blocks (e.g., spacers) creating a gap region 108, a fifth layer of SWNT-film 110, and a sixth layer of PDMS 112. For ease of reference, the following disclosure references the various silicon layers as PDMS material and the carbon nanotubes as SWNTs; however, embodiments in accordance with the present disclosure are not so limited.

FIG. 1B illustrates a schematic depiction of the electronic skin pressure sensor with the layers combined in accordance with various embodiments. Films of carbon nanotubes, such as SWNTs 104,106, can be the first and second electrodes (e.g., top and bottom electrodes) while the porous PDMS layer 106 and gap region 108 form the dielectric region of the electronic skin pressure sensor. Negative charges on the porous PDMS surface 106 can be generated via ultraviolet ozone (UVO) treatment and via triboelectric effect between PDMS 106 and SWNT surface 104, with a surface charge density of approximately $-1.7\ \mu C/m^2$ (measured using surface potentiometer). Electronic skin pressure sensors, in accordance with the present disclosure, surprisingly, result in both sensitive pressure detection and electrical power generation. The gap region 108 can be used to increase the pressure sensing dynamic range of the electronic skin pressure sensor, such as to sense pressure in the low pressure region (<1 kPa), while the porous PDMS layer 106 can be used to sense pressure in the higher pressure region (>1 kPa). For energy collecting and/or harvesting, the gap region 108 and charges on the PDMS surface 106 can be utilized to generate voltage and current, as discussed further herein.

Figure 1C:
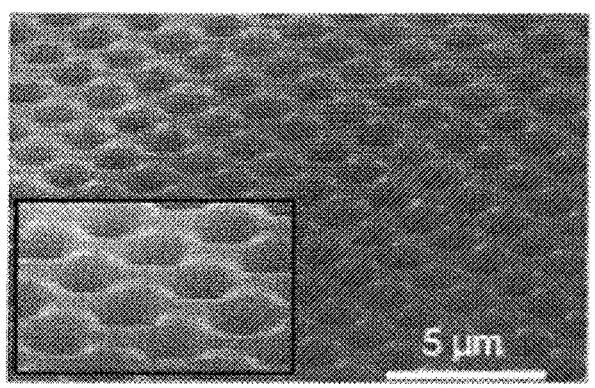
FIG. 1C illustrates an image of the porous PDMS layer of an electric skin pressure sensor in accordance with various embodiments.

FIG. 1C illustrates an image of the porous PDMS layer of an electronic skin pressure sensor in accordance with various embodiments. The inset includes a higher resolution image of the porous PDMS layer 106 than the main image of FIG. 1C. For example, the image can include a scanning electron microscopy (SEM) image of a surface of the porous PDMS layer 106, showing regularly spaced 2 µm wide pores. The gap region can be formed by two or more PDMS blocks, which separate the porous PDMS layer 106 and the SWNT-film (e.g., the fifth layer of SWNT-film). PDMS, in various embodiments, can be used as the silicon material due to its intrinsic stretchability, biocompatibility, and its ability to conformably adhere to human skin. Further, in various related embodiments, SWNT-films can be used as electrodes due to their stretchability and conductivity.

Figure 1D:
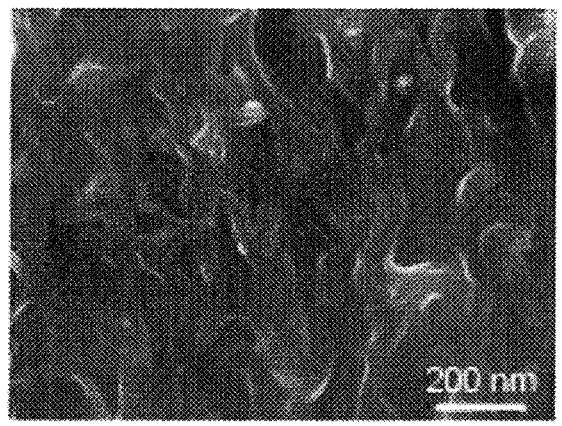
FIG. 1D illustrates an image of a SWNT-film layer of an electronic skin pressure sensor in accordance with various embodiments.

FIG. 1D illustrates an image of a SWNT-film layer of an electronic skin pressure sensor in accordance with various embodiments. For example, the image can include an SEM image of the buckled SWNTS 104 on the PDMS surface (e.g., SWNT-coated PDMS surface), showing the wavy conformation of the SWNTs. The wavy conformation can be generated by stressing (e.g., straining) and releasing the SWNT film 104 by fifty-percent, which may buckle the SWNTs along the stress direction. In experimental embodiments, the sheet resistance of an electronic skin pressure sensor under no stress can be $720\Omega/\square$, and can be increased by ten-percent at thirty-percent stress, as further illustrated and discussed herein. The buckling of the SWNTs 104 renders the film 'spring-like,' making the film stretchable. In further experimental embodiments, electronic skin pressure sensors can be stretched up to thirty-percent, which can be useful for electronic skin applications.

Further, although not illustrated by FIGS. 1A-1D, in various aspects of the present disclosure, an apparatus can include an array of electronic skin pressure sensors, for sensing pressure and position. For example, by arranging a multitude of such sensors as part of a pressure-sensitive device, the output of respective electrodes for each pressure sensor can be used to detect pressure at the sensors. Moreover, relative pressure can be determined at the respective sensors by detecting variations in the outputs at the sense electrodes of each sensor. The array of electronic skin pressure sensors can be formed using an array of electrodes (e.g., SWNT film) to form a pixilated pressure sensor apparatus. For the pixilated pressure sensor apparatus, parallel strips of the first (e.g., top) and second (e.g., bottom) electrodes can be oriented perpendicular to each other to create a pixel array, as further discussed herein. PDMS blocks can be placed at the corners of every pixel (e.g., the intersection of the parallel strips of the first and the second electrodes).

As discussed further herein, each of the pressure sensors of the array can include circuitry configured and arranged to measure pressure. The sensor circuitry can respond to the pressure sensor array by sensing a change in impedance of at least one pressure sensor of the array, and detecting a position of the mechanical stimuli in response to the sensed change in impedance of the at least one pressure sensor.

Consistent with the discussion above with regard to FIGS. 1A-1D, FIG. 2A illustrates an example of using an electronic skin pressure sensor to detect pressure in accordance with various embodiments. Pressure sensing can be conducted by detecting the change in impedance (e.g., the capacitance) due to the change in the distance between the two electrodes 214, 216 (e.g., the top and bottom electrodes). For example, the electronic skin pressure sensor, as further illustrated herein, can include two electrodes 214, 216 and an elastomer/dielectric region 218. The two electrodes 214, 216, as illustrated by FIG. 1A-1B, can be the two layers of SWNT-film. The elastomer/dielectric region 218 can include the porous PDMS and the gap region (e.g., filled with air) created by the PDMS blocks as illustrated by FIGS. 1A-1B. As illustrated by FIG. 2B, when pressure is applied to the electronic skin pressure sensor, an impedance (e.g. capacitance) of the two electrodes can change. The capacitance can be determined by:

$$C = \frac{\epsilon_r \epsilon_o A}{d} \quad \text{(Eq. 1)}$$

Further, as illustrated by the graph of FIG. 2, greater pressure can result in a greater change in capacitance.

Figure 3A:
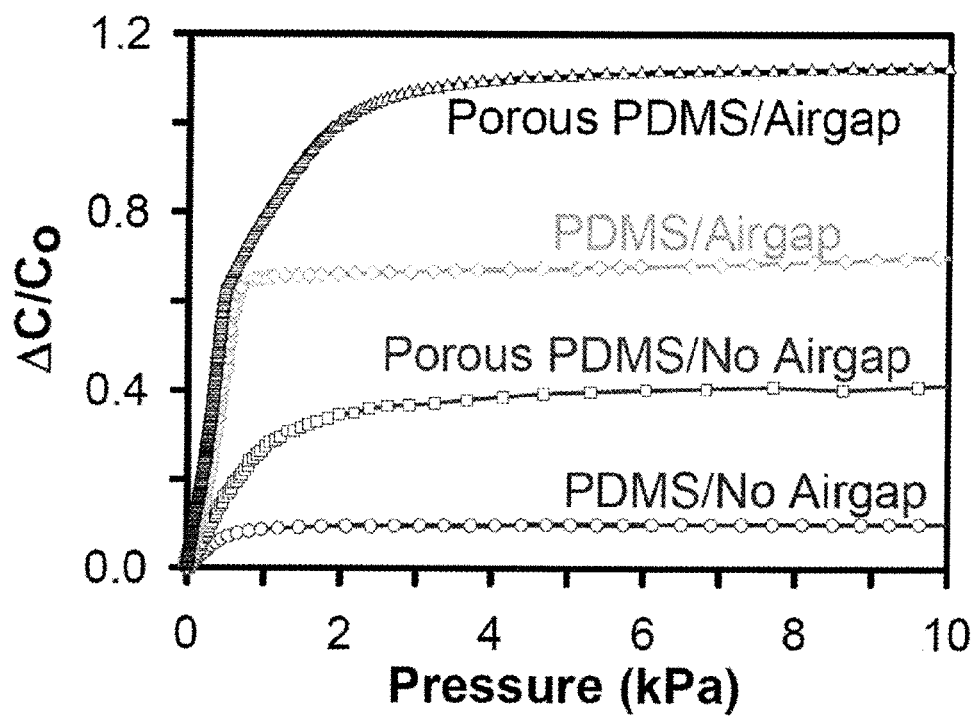
FIGS. 3A-3D illustrate examples of detecting pressure using an electronic skin pressure sensor in accordance with various embodiments.

Consistent with the discussion above with regard to FIGS. 1A-1D, FIGS. 3A-3D illustrates examples of detecting pressure using an electronic skin pressure sensor in accordance with various embodiments. FIG. 3A illustrates a graph plotting change in capacitance verses pressure using different devices, in accordance with example detailed/experimental embodiments. For example, the change in capacitance ($\Delta C/C_o$) as a function of pressure can be obtained using an electronic skin pressure sensor with unpatterned PDMS and without a gap region (e.g., represented by the circles in FIG. 3A), an electronic skin pressure sensor with porous PDMS and without a gap region (e.g., represented by the squares in FIG. 3A), an electronic skin pressure sensor with unpatterned PDMS and with a 0.7 mm gap region (e.g., represented by the diamond in FIG. 3A), and an electronic skin pressure sensor with porous PDMS and with a 0.7 mm gap region (e.g., represented by the triangle in FIG. 3A). Both the gap region and the porous PDMS can increase the pressure sensitivity of the electronic skin pressure sensor, in accordance with various embodiments. For the pressure sensor with unpatterned PDMS surface without a gap region (blue/circle curve), the increase in capacitance is due to the decrease in the distance between the two electrodes (e.g., top and bottom electrodes) as the PDMS is compressed. Such a low sensitivity is due to the large pressure needed to compress a filled dielectric layer, which can also cause low sensitivity. On the contrary, the pressure sensor with porous PDMS without a gap region (red/square curve) can yield better pressure sensitivity than the unpatterned PDMS without a gap region device due to the combined effect of less pressure to deform the porous PDMS and air being driven out of the voids, changing the dielectric constant as the PDMS is compressed. When a gap region is used, sensitivity can increase, as compared to a pressure sensor without a gap region, in the low pressure region (e.g., represented by the diamond and triangle curve). The gap region allows for the distance between the two electrodes (e.g., top and bottom electrodes) to change under relatively low pressures, resulting in a large rate of change in capacitance under small changes in pressure. The change in the slope of the curves at approximately 1 kPa can be due to the PDMS surface coming into contact with one of the electrodes (e.g., the bottom electrode that is proximal to the skin of a subject), and is the point at which the PDMS layer may start to deform. When an unpatterned PDMS layer is used with a gap region (e.g., represented by the diamond curve), sensitivity dropped significantly when the PDMS surface made contact with one of the electrodes (e.g., the bottom electrode), which as stated above, is due to the difficulty of deforming a filled dielectric layer. In addition, due to the adhesiveness of PDMS to the SWNT surface, a uniform PDMS thin film layer may not be readily detached from the bottom SWNT electrode once it makes contact, rendering it difficult to measure pressure repeatedly.

Figure 3B:
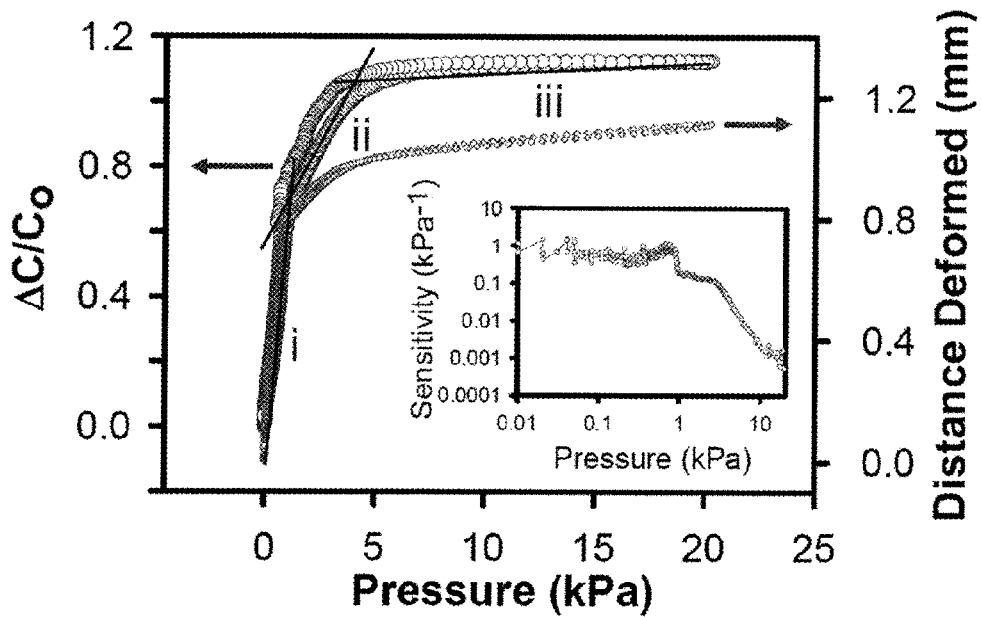
Figure 3C:
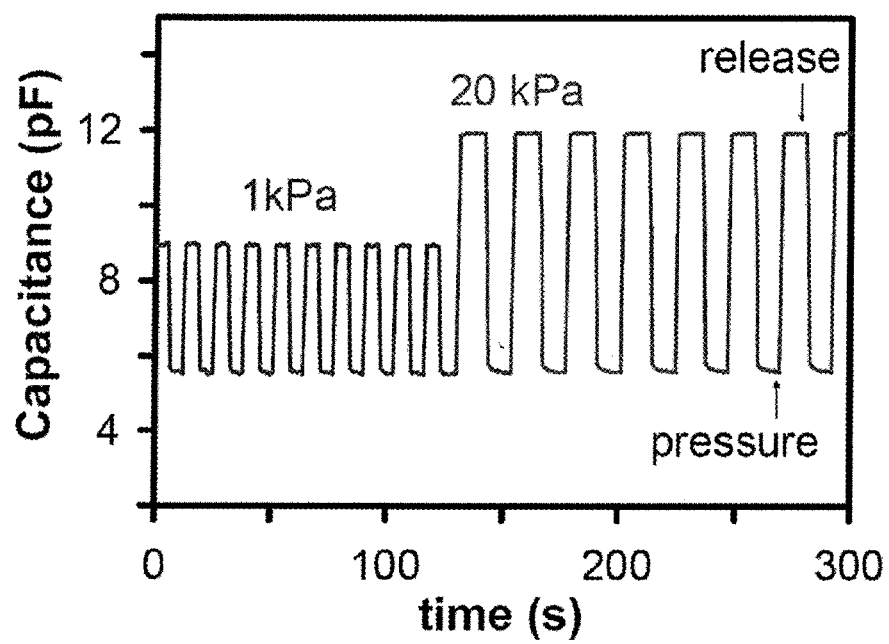

FIG. 3B illustrates a graph plotting change in impedance verses distance deformed as a function of pressure using an electronic skin pressure sensor with porous PDMS and a gap region in accordance with example detailed/experimental embodiments. The impedance can include capacitance, in a number of embodiments. The highest overall pressure sensitivity, of the above described electronic skin pressure sensors, can be obtained when the porous PDMS surface is used along with a gap region (e.g., represented by the triangle curve), as the gap region allows for pressure sensitivity in the low pressure region while the porous PDMS allows for pressure sensitive response in the higher pressure region. In addition, the porous surface of PDMS can be non-adhesive to the bottom SWNT electrode due to the reduced contact area, allowing for repeated pressure sensing. As shown in FIG. 3B, both the change in capacitance and distance deformed undergoes a change in slope at around 1 kPa, an indication of the PDMS surface coming in contact with the bottom electrode (e.g., the SWNT layer that is illustrated as on the bottom, and proximal to the gap region and/or interface with the skin of the subject). In region i of FIG. 3B (pressure <1 kPa), the average sensitivity ($S=\delta(\Delta C/Co)/\delta p$) can be 0.7 $kPa^{-1}$ with a maximum value at 1.5 $kPa^{-1}$. In region ii, where the porous PDMS is being deformed (pressure 1-5 kPa), the average sensitivity can be 0.14 $kPa^{-1}$. In region iii (pressure >5 kPa), the sensitivity can be further reduced to 0.005 $kPa^{-1}$ as PDMS is compressed, requiring higher pressure to further deform the PDMS. The observed minor hysteresis in the capacitance versus pressure plot in FIG. 3B is a result of finite relaxation time for the PDMS to revert back to the original state after mechanical stress is released, yielding slightly higher capacitance in the backward sweep than in the forward sweep. Upon the release of 1 kPa and 20 kPa of pressure, electronic skin devices in accordance with the present disclosure can return to 97% of its original capacitance within approximately one second (FIG. 3C). FIG. 3C illustrates a graph plotting change in impedance (e.g., capacitance) verses time under repeated pressure of 1 and 20 kPa, in accordance with example detailed/experimental embodiments.

Figure 3D:
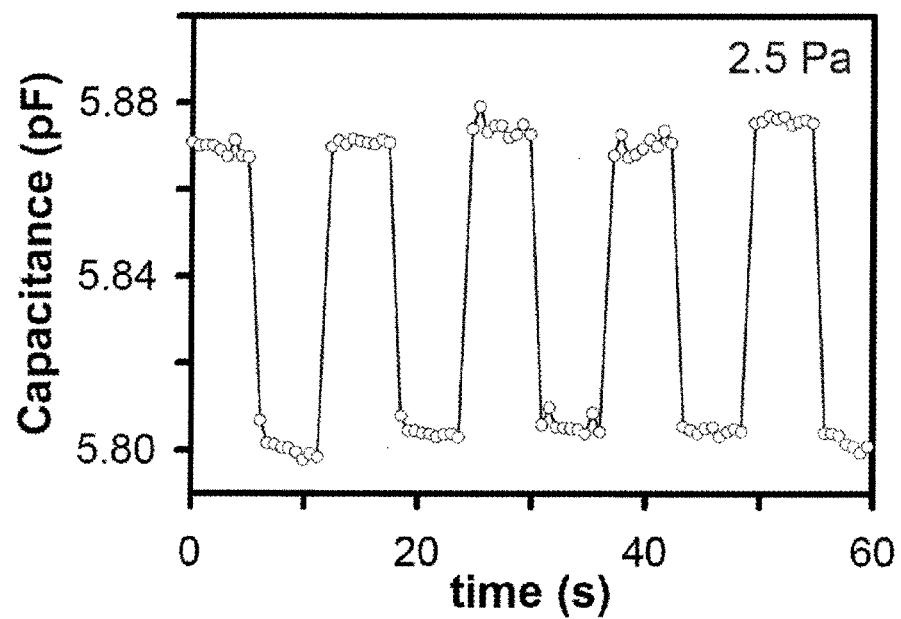

FIG. 3D illustrates a graph plotting change in impedance (e.g., capacitance) verses time of an electronic skin pressure sensor under repeated pressure of 2.5 Pa, in accordance with example detailed/experimental embodiments. For example, the graph illustrates a plot of capacitance versus time under a low pressure of 2.5 Pa, showing a change in signal of 1.2 percent.

Figure 4:
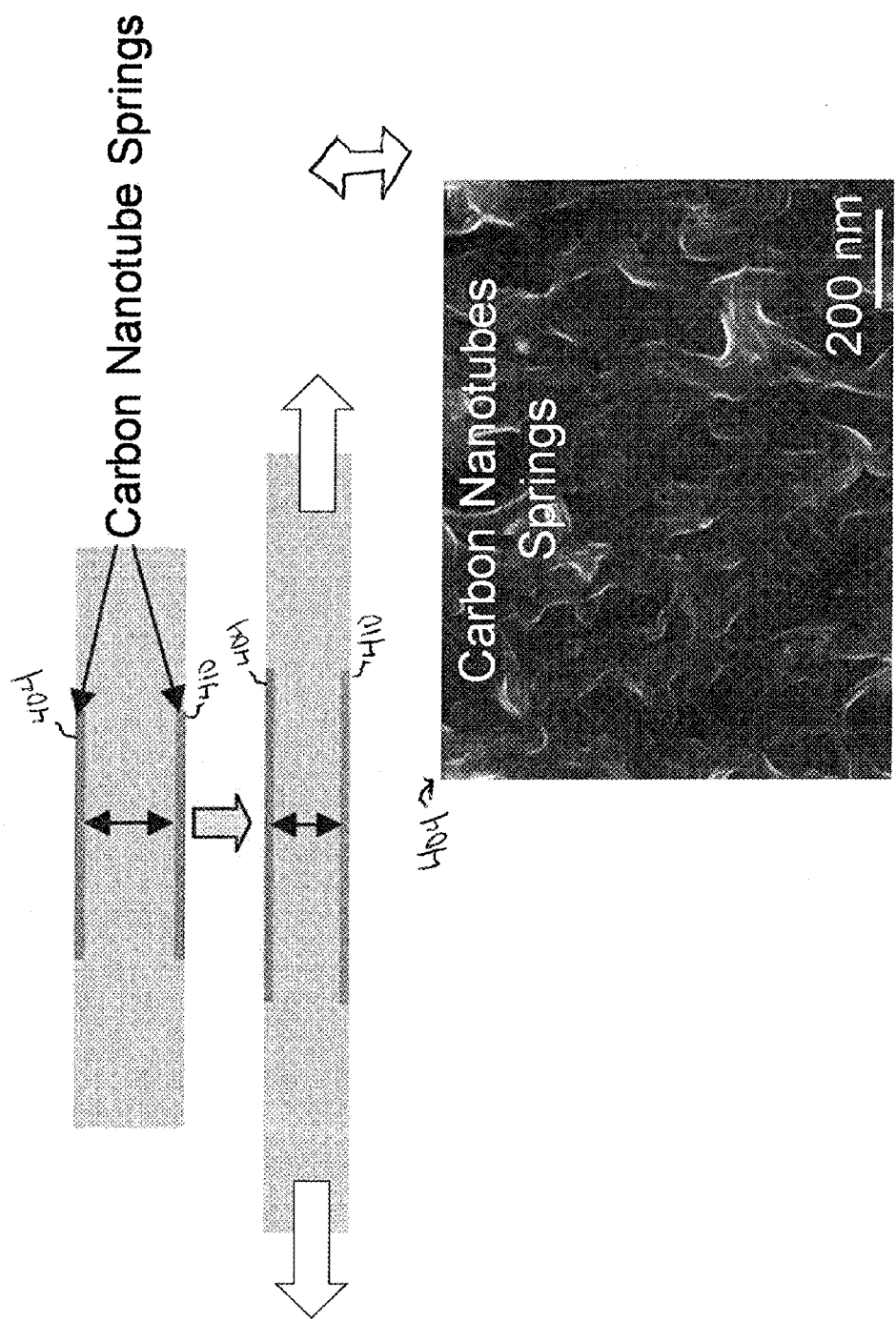
FIG. 4 illustrates an example of the stretchability of an electronic skin pressure sensor in accordance with various embodiments.

Consistent with the discussion above with regard to FIGS. 1A-1D, FIG. 4 illustrates an example of the stretchability of an electronic skin pressure sensor in accordance with various embodiments. As illustrated by FIG. 4, the SWNT-film layers 404,410 can act as springs. As previously discussed, the buckling of the SWNTs 404,410 renders the film 'spring-like,' making the film stretchable. For example, the SWNT-film layers 404,410 can retract (in a y direction relative to the orientation of the pressure sensor) in response to stimuli in a lateral direction, as illustrated by the arrows. The stimuli can include stretching forces on the pressure sensor (in an x direction relative to the orientation of the pressure sensor). Thereby, nanostructures, such as carbon nanotubes, can facilitate stretchability attributes of the electronic skin pressure sensor and/or an apparatus formed with the electronic skin pressure sensor, such as stretchable electronic devices. By way of a cross-sectional view without pressure and with pressure (i.e., the middle view) with an exemplary image of the carbon nanotube springs (e.g., film) used in this illustration to implement the opposing electrodes on either side of the dielectric. At the bottom of FIG. 4, includes an image of a SWNT-film layer 404.

Figure 5A:
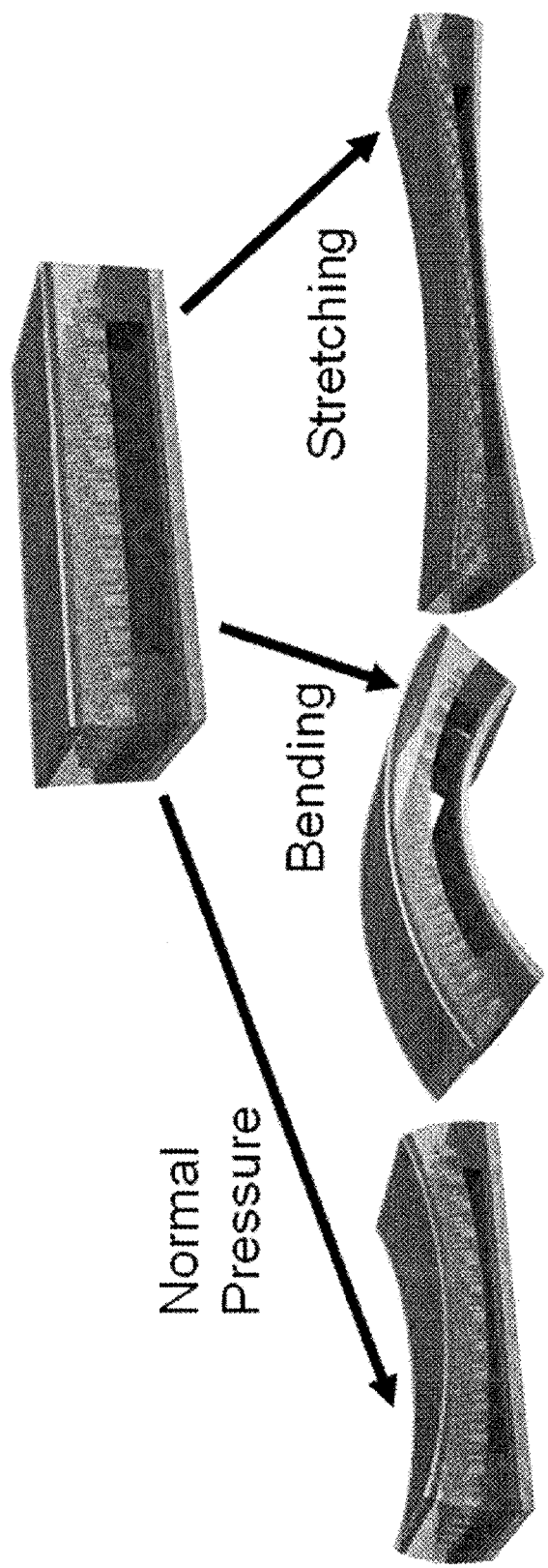
FIGS. 5A-5B illustrate examples of mechanical stimuli that are differentiated using an electronic skin pressure sensor in accordance with various embodiments.
Figure 5B:
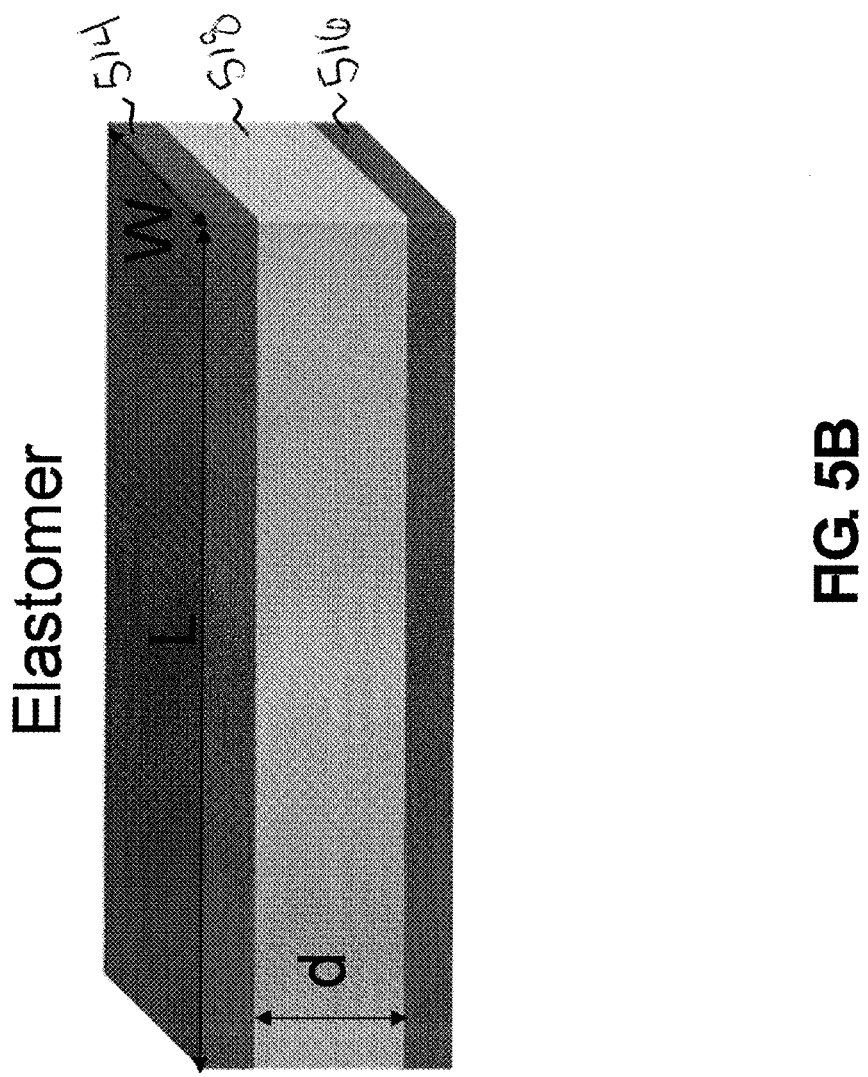

Consistent with the discussion above with regard to FIGS. 1A-1D and FIG. 2B, FIGS. 5A-5B illustrate examples of mechanical stimuli that can be differentiated using an electronic skin pressure sensor in accordance with various embodiments. As illustrated by FIG. 5A, the mechanical stimuli can include pressure, bending, flexing, and lateral stress (e.g., as illustrated by FIG. 4). As illustrated by FIG. 5B, the mechanical stimuli can be detected and/or differentiated based on a change in impedance due to lateral stress. For example, in various embodiments, the change in impedance can include change in capacitance, a change in film resistance of the first electrode 514, and/or the change in film resistance of the second electrode 516 (e.g., the SWNT film 104, 110 illustrated by FIG. 1A-1D). The capacitance can be measured using Equation 1 above. The film-resistance can be measured by:

$$R = \rho \frac{L}{W}. \quad \text{(Eq. 2)}$$

Detecting and distinguishing of various mechanical stimuli is a feature of example electronic skin pressure sensors in accordance with various embodiments. The stretchability of the electronic skin pressure sensor can be used to simultaneously measure the change in capacitance and the change in resistance of the top 514 and bottom electrodes 516. As mentioned previously, the increase in capacitance is due to the decrease in the distance between the top and bottom electrodes 514, 516 (with the dielectric region 518 between); whereas, the increase in the resistance of the SWNT films under lateral stress is due to the increase in length of the film.

Figure 6:
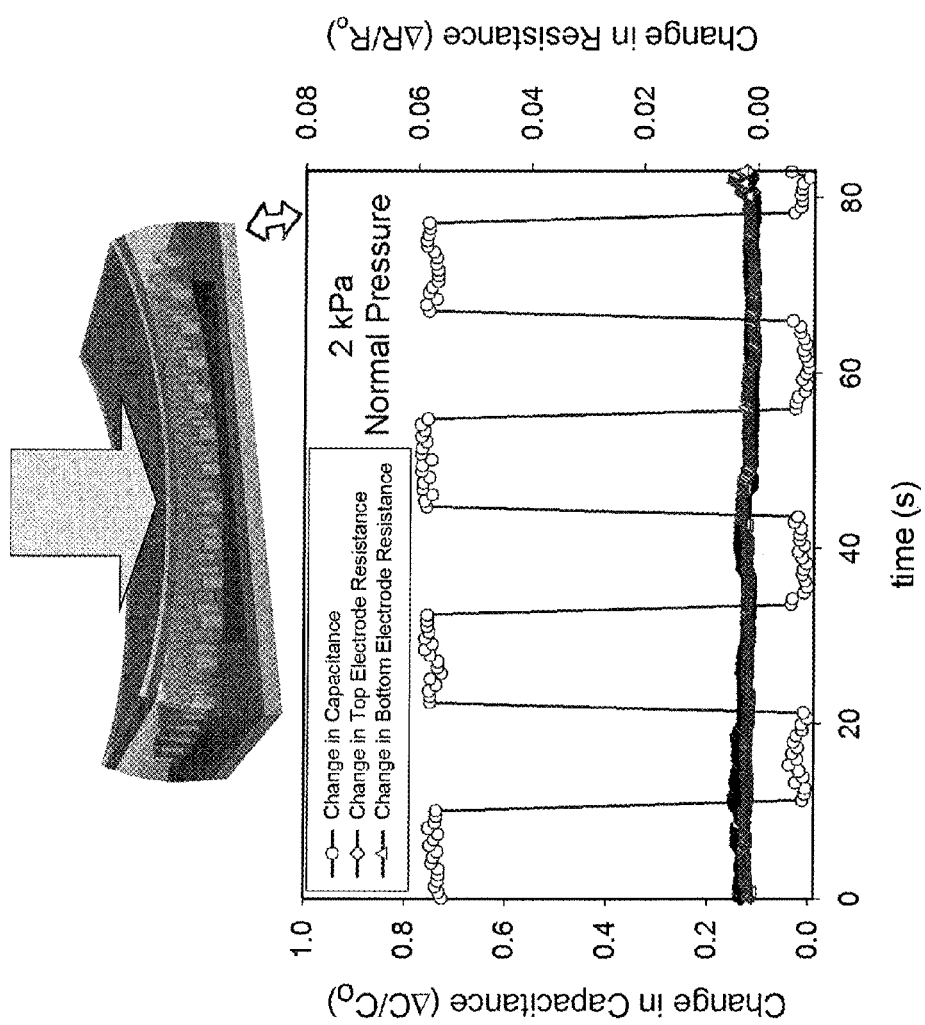
FIG. 6 illustrates a graph plotting change in impedance as a function of time of an electronic skin pressure sensor under a repeated pressure in accordance with various embodiments.

Consistent with the discussion above with regard to FIGS. 1A-1D, FIG. 6 illustrates a graph plotting change in impedance (e.g., capacitance and film resistances) as a function of time under a repeated pressure of 2 kPa, in accordance with example detailed/experimental embodiments. Under normal pressure, in experimental embodiments, an increase in capacitance by eighty-percent can occur, while negligible change in the resistance of the top and bottom electrodes can occur due to the lack of lateral stress (e.g., straining) of the SWNT films. Thus, as illustrated by FIG. 6, when mechanical stimuli effecting the electronic skin pressure sensor is pressure, the capacitance can change according to the pressure applied (and/or pressure released), the film-resistance of the first and second electrodes may remain relatively unchanged.

Consistent with the discussion above with regard to FIGS. 1A-1D, FIG. 7A illustrates a graph plotting change in impedance (e.g., capacitance and film resistances) as a function of bending angles of the electronic skin pressure sensors from zero degrees to sixty-five degree angles, in accordance with example detailed/experimental embodiments.

Figure 7A:
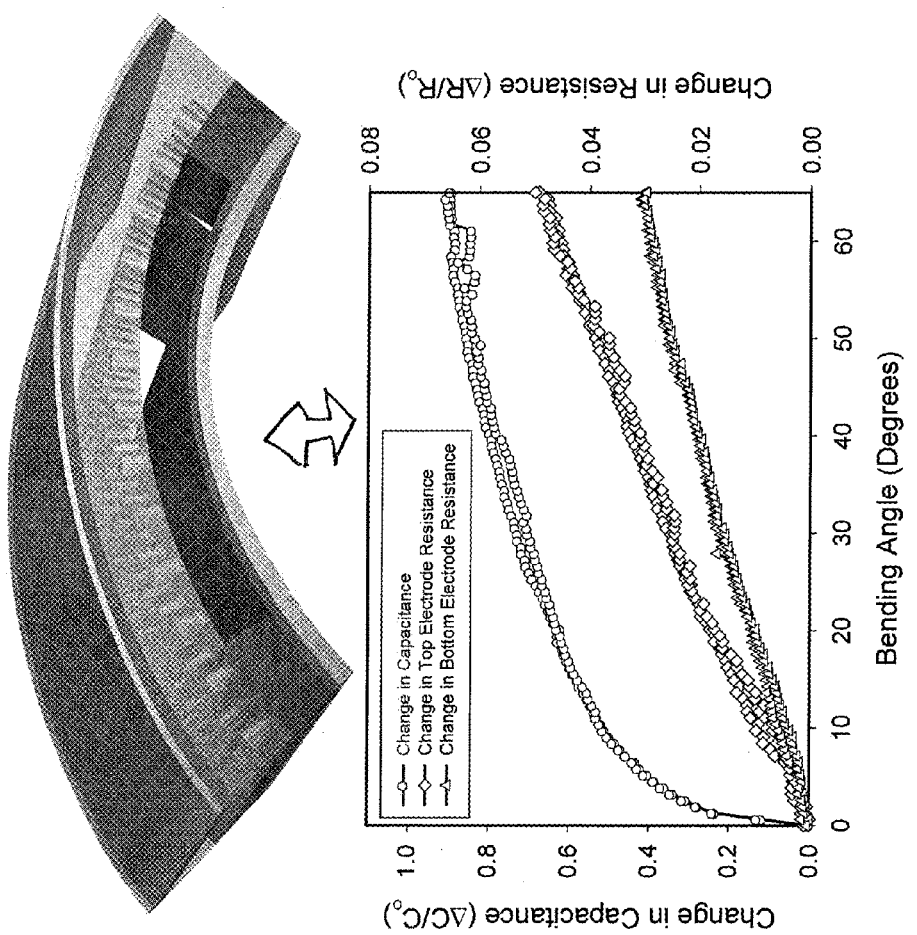
FIG. 7A illustrates a graph plotting change in impedance as a function of bending angles of the electronic skin pressure sensor from zero degrees to sixty-five degree angles in accordance with various embodiments.
Figure 7B:
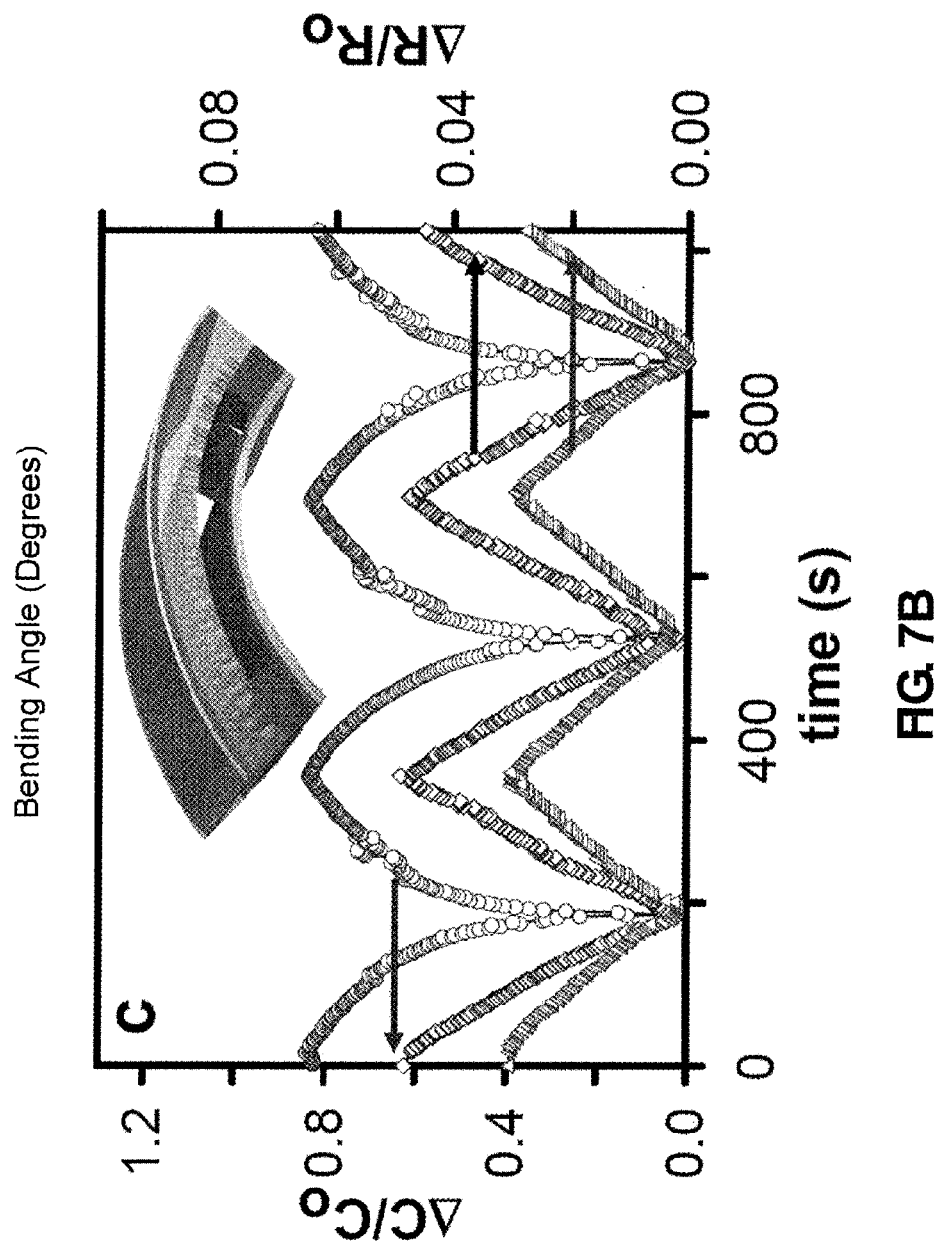
FIG. 7B illustrates a graph plotting change in impedance as a function of time at incrementally increasing and decreasing bending angles of the electronic skin pressure sensor of zero degrees to sixty-five degree angles in accordance with various embodiments.

Consistent with the discussion above with regard to FIGS. 1A-1D, FIG. 7B illustrates a graph plotting change in impedance (e.g., capacitance and film resistances) as a function of time at incrementally increasing and decreasing bending angles of the electronic skin pressure sensors of zero degrees to sixty-five degree angles, in accordance with example detailed/experimental embodiments. Under bending, a non-linear change in capacitance as a function of bending angle can be observed (e.g., FIGS. 7A-7B) due to the varying rate of change in the distance between the two electrodes at different bending angles. The resistance of both the electrodes changes under bending due to lateral stressing (e.g., straining) of the SWNT films. Lateral stress ($\in$) due to bending is related to the radius of curvature (R) by $\in=y/R$, where y is the position of the film with respect to the neutral axis. Since the top electrode is further away from the neutral axis, the rate of change in resistance of the top electrode can be greater than that of the bottom electrode. Thus, as illustrated by FIGS. 7A-7B, when mechanical stimuli effecting the electronic skin pressure sensor causes the electronic skin pressure sensor to bend, the capacitance can change in a non-linear manner, and the change in film-resistance of the one of the electrodes (e.g., top) can be greater than the change in film-resistance of the other electrode (e.g., bottom).

Figure 8A:
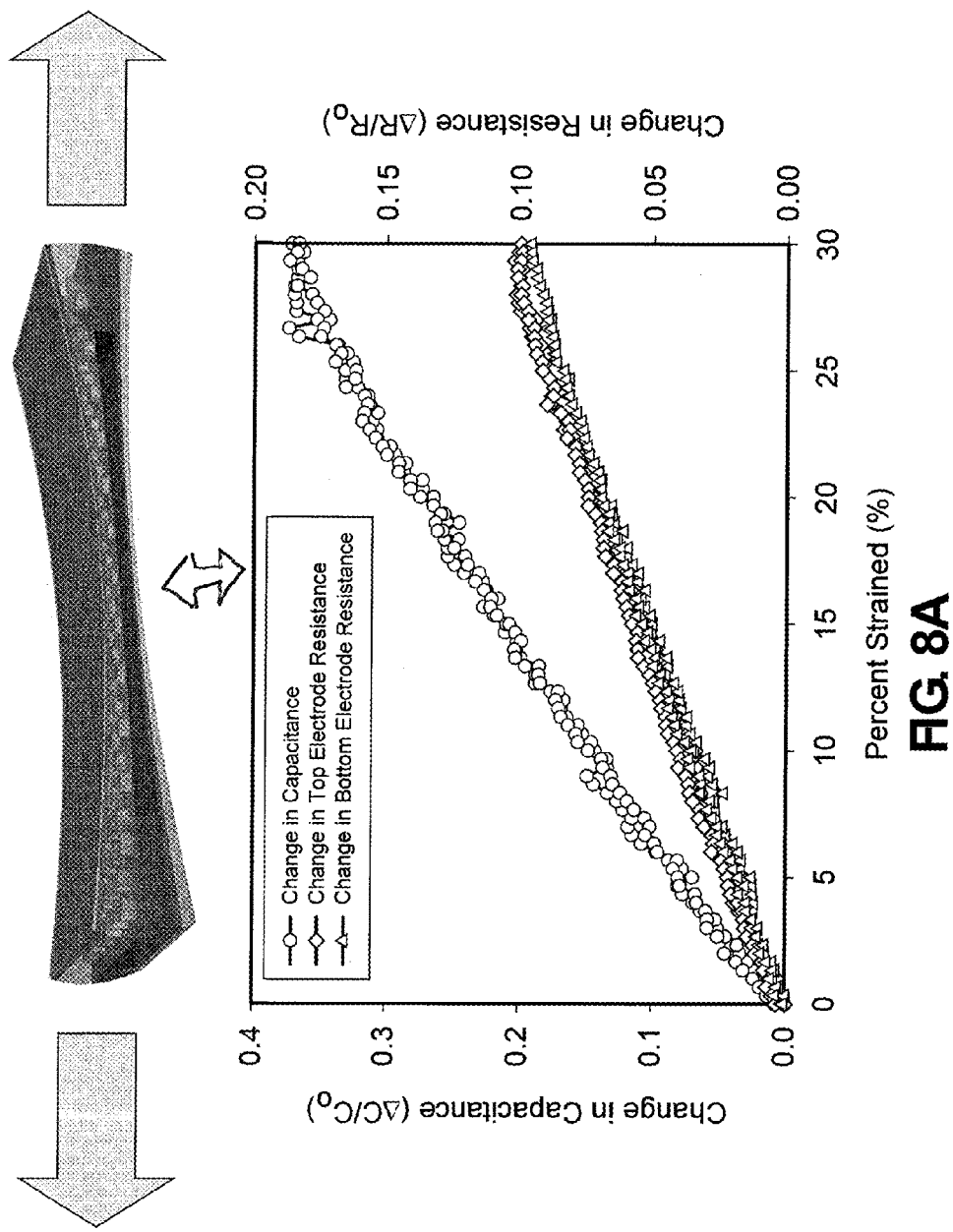
FIG. 8A illustrates a graph plotting change in impedance as a function of percent stress laterally in accordance with various embodiments.
Figure 8B:
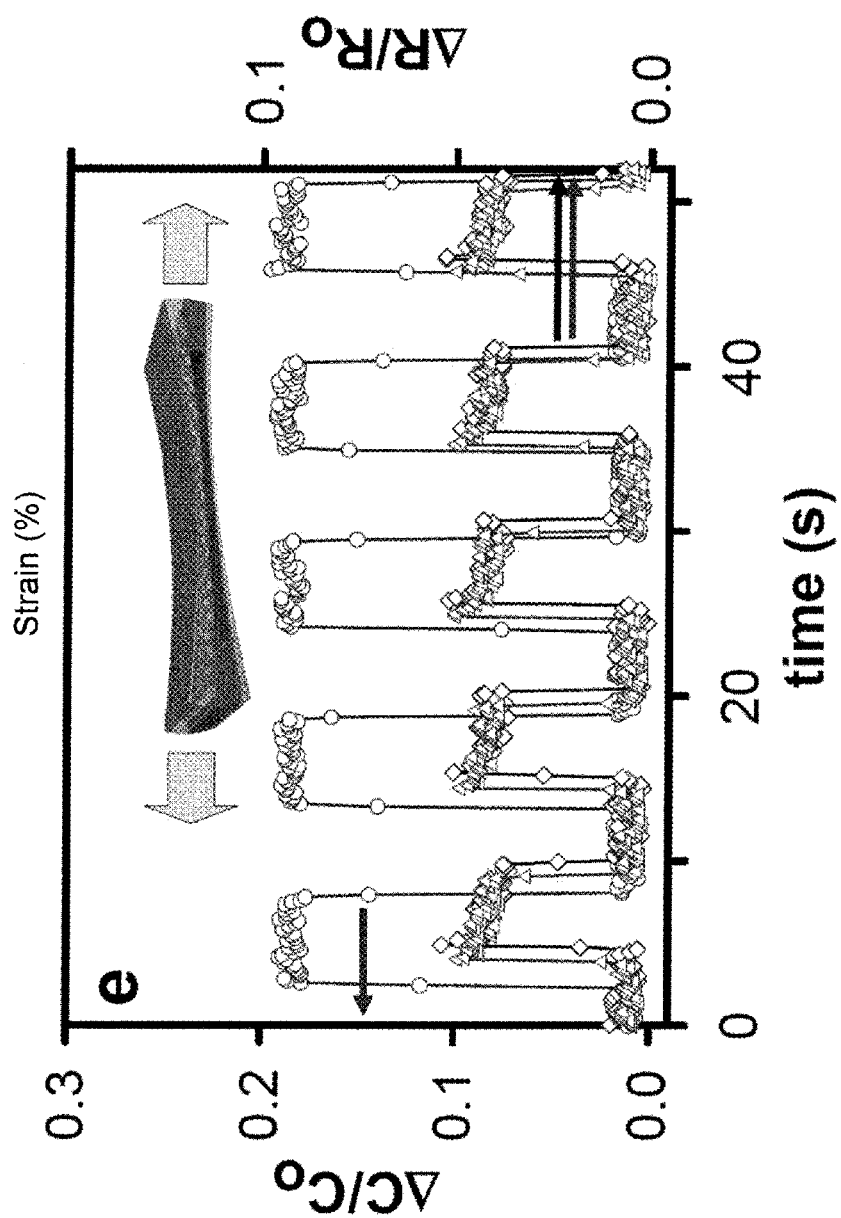
FIG. 8B illustrates a graph plotting change in impedance as a function of time at repeated stress of an electronic skin pressure sensor at fifteen-percent in accordance with various embodiments.
Figure 9A:
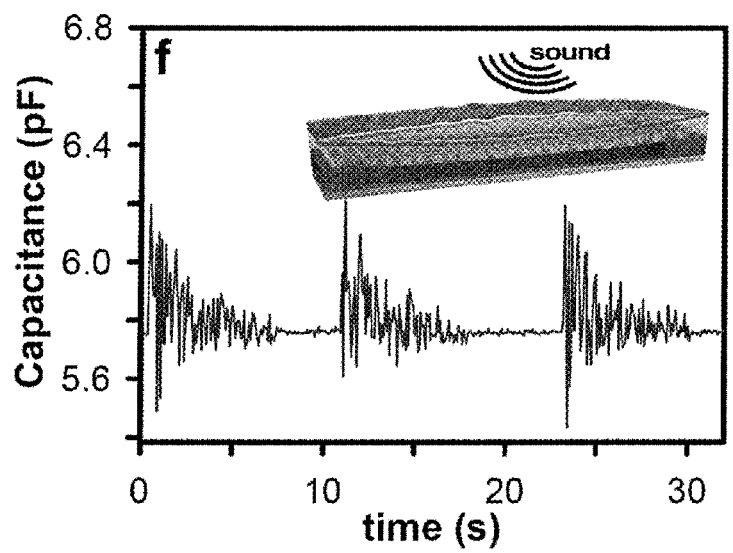
FIGS. 9A-C illustrate examples of graphs plotting change in impedance as a function of time of electronic skin pressure sensor under sound vibration in accordance with various embodiments.
Figure 9B:
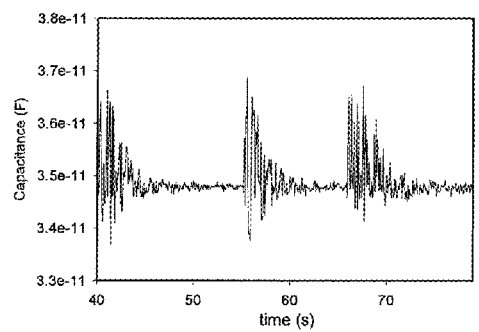
Figure 9C:
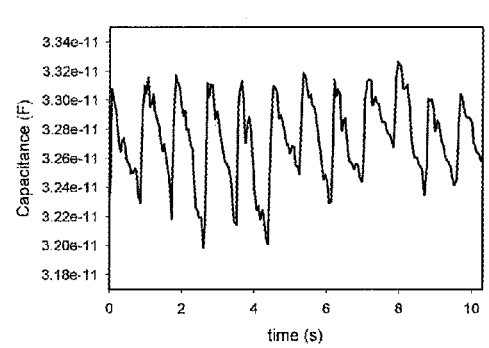

Consistent with the discussion above with regard to FIGS. 1A-1D, FIG. 8A illustrates a graph plotting change in impedance (e.g., capacitance and film resistances) as a function of percent stress laterally, in accordance with example detailed/experimental embodiments. Consistent with the discussion above with regard to FIGS. 1A-1D, FIG. 8B illustrates a graph plotting change in impedance (e.g., capacitance and film resistances) as a function of time at repeated stress of fifteen-percent, in accordance with example detailed/experimental embodiments. When the electronics skin pressure sensor is laterally stretched (e.g., FIGS. 8A-8B), the distance between the two electrodes decreases due to poisson effect, resulting in an increase in capacitance. The capacitive gauge factor ($\Delta C/C_o \in_{stress}^{-1}$) can be calculated to be 1.3. The increase in capacitance and resistances of the films can be linear as a function of stress. Since the two electrodes are stressed to the same amount under lateral stress, a similar change in resistance of the top and bottom film can occur. Thus, as illustrated by FIGS. 8A-8B, when mechanical stimuli effecting the electronic skin pressure sensor is a lateral stress (e.g., thereby causing the electronic skin pressure sensor to stretch laterally), the capacitance can change in a linear manner, and the change in film-resistance of the first electrodes (e.g., top) and second electrodes (e.g., bottom) can be linear and/or relatively the same.

Consistent with the discussion above with regard to FIGS. 1A-1D, FIGS. 9A-C illustrate examples of graphs plotting change in impedance (e.g., capacitance) as a function of time under sound vibration, in accordance with example detailed/experimental embodiments. For example, the sound vibration can include a human hitting a guitar string. In various related aspects, the electronic skin pressure sensor in accordance with present disclosure can be used to detect sound-driven vibration. In experimental embodiments, by placing the electronic skin device on a speaker (which is connected to a guitar) and plucking a guitar string (sound intensity of approximately 80 decibels (dB)), fluctuations in the capacitance of electronic skin pressure sensor can be observed (no change in film resistance is observed), where the magnitude of this fluctuation represented sound amplitude. As evident by FIG. 9A-9C, when a guitar string is plucked, the magnitude of fluctuation in the capacitance increased, and decreased gradually over approximately 6 seconds due to gradual sound dampening. The detection and distinguish of a variety of tactile information by observing the different behaviors in the change in capacitance and in the change in the film resistances renders the electronic skin pressure sensors useful in emulating human skin for a variety of touch sensor based applications.

Consistent with the discussion above with regard to FIGS. 1A-1D and FIG. 4, FIGS. 10A-10B show an exemplary sensor circuitry used with an electronic skin pressure in accordance with various embodiments. Surprisingly, the capacitive sensor design allows for power generation through surface charges on the PDMS surface. Thereby, in various embodiments, the sensor circuitry and/or other circuitry can collect, harvest, and/or store energy ensuing from the change in impedance due to the lateral stress. As previously described, the pressure sensor can include circuitry. The circuitry can include opposing electrodes (e.g., SWNT films 1004, 1010) and a dielectric region (e.g., porous PDMS 1006 and gap region 1008). The sensor circuitry 1020 can include output/processing circuitry, as described above.

The collected energy can be provided to a load and/or storage circuitry by the sensor circuitry 1020 and/or additional circuitry. The load can be internal to the electronic skin pressure sensor (e.g. self-powering) and/or external to the electronic skin pressure sensor (e.g., an external load). Example storage circuits can include a supercapacitor, stretchable supercapacitor, and/or a rechargeable battery. For example, energy ensuing therefrom, using the sensor circuitry 1020, can supplement a power source of a load in the form of an electrical circuit. In accordance with some aspects, the apparatus can include stretchable electronic circuitry that is configured to consume power, at least in part, by harvesting the collected energy from the change in impedance. For example, the apparatus can include silver nanostructures configured with and/or in the stretchable electronic circuitry.

The PDMS surface 1008 can be initially negatively charged during UVO treatment and the surface charges can be generated and maintained through contact with the bottom SWNT electrode 1010 via triboelectric effect. When PDMS 1006 and SWNTs 1010, 1004 are in contact with each other, the PDMS surface 1006 becomes negative since PDMS 1006 has the tendency of gaining electrons when in contact with SWNT in the triboelectric series. To balance the negative charges on the porous PDMS surface ($Q_{PDMS}$), positive charges accumulate on the top ($Q_{top}$) and bottom ($Q_{bot}$) electrodes so that:

$$|Q_{PDMS}|=|Q_{top}+Q_{bot}| \quad \text{(Eq. 3)}$$

When pressure is applied and released, the distance between the electrodes changes (e.g., SWNTS 1004, 1008). This causes charges to move back and forth between the top and bottom electrodes, resulting in current flow in a circuit, such as an external circuit (e.g., external to the electronic skin device).

Figure 10A:
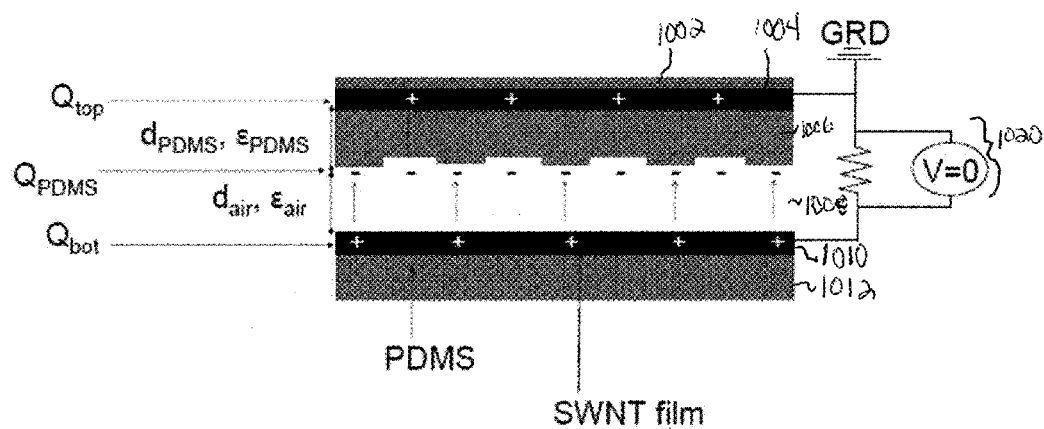
FIGS. 10A-10B show an example electronic pressure sensor and sensor circuitry configured to collect, measure, and/or harvest energy ensuing from a change in impedance due to the mechanical stimuli of lateral stress in accordance with various embodiments.
Figure 10B:
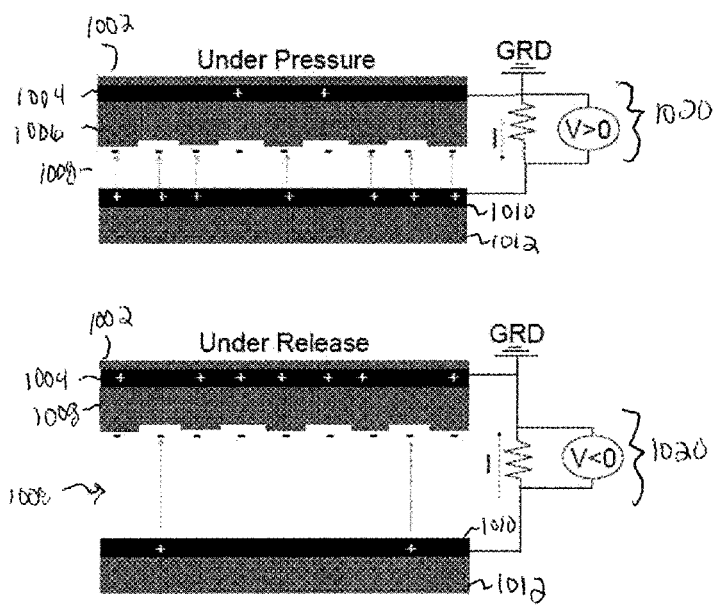

For example, FIG. 10A illustrates a schematic of exemplary sensor circuitry used with an electronic skin pressure sensor consistent with aspects described above. For example, a first electrode (e.g., 1004) can be connected to ground, and both electrodes (e.g., 1004, 1010) connected by the sensor circuitry 1020. Surprisingly, the electronic skin pressure sensor is capable of harvesting various mechanical stimuli mentioned above with voltage and current generation in the range of tens of volts and tenths to several microampere ($\mu$A)/cm$^2$, respectively. The sensor circuitry 1020 can, in some embodiments, include a load resistor. As illustrated by FIG. 10B, current is generated in opposite directions when pressure is applied and released. Total change in voltage ($\Delta$V) can be expressed as:

$$\Delta V = \frac{Q_{bot} - \Delta d_{air}}{\epsilon_{air} A} \quad \text{(Eq. 4)}$$

where $\Delta d_{air}$ is the change in the gap region 1008 due to applied pressure, $\epsilon_{air}$ is the dielectric constant of air, and A is the area of the pressure sensor. The electronic skin pressure sensor can include two capacitors. The first capacitor (e.g., a top capacitor) can be composed of the first electrode (e.g., the SWNT-film 1004), the layer of PDMS 1002, and the layer of porous PDMS 1006. The second capacitor (e.g., the bottom capacitor) can be composed of the second electrode (e.g., the SWNT-film 1010), the layer of PDMS 1012, and the gap region 1008. The capacitance of the first (e.g., top) and the second (e.g., bottom) capacitors can be defined as:

$$C_{top}=Q_{top}/|V_{top}-V_{PDMS}| \quad \text{(Eq. 5)}$$

$$C_{bot}=Q_{bot}/|V_{PDMS}-V_{bot}| \quad \text{(Eq. 6)}$$

In aspects where the two capacitors are connected through circuitry (e.g., the resistor), the electrostatic potential between the first and the second electrode ($V_{top}-V_{bot}$) under static mode can be zero. In other words, $|V_{top}-V_{PDMS}|=|V_{PDMS}+V_{bot}|$. Using this relationship, along with Equations 5 and 6, $Q_{top}$ and $Q_{bot}$ can be expressed as:

$$Q_{top} = \frac{C_{top}Q_{PDMS}}{C_{top}+C_{bot}} = \frac{\epsilon_{PDMS}\,d_{air}}{\epsilon_{PDMS}\,d_{air}+\epsilon_{air}\,d_{PDMS}}Q_{PDMS} \quad \text{(Eq. 7)}$$

$$Q_{bot} = \frac{C_{bot}Q_{PDMS}}{C_{top}+C_{bot}} = \frac{\epsilon_{air}\,d_{PDMS}}{\epsilon_{PDMS}\,d_{air}+\epsilon_{air}\,d_{PDMS}}Q_{PDMS} \quad \text{(Eq. 8)}$$

When pressure is applied and released, the distance between the electrodes distance (d) changes. According to Equations 7 and 8, this causes charges to move back and forth between the first and the second electrodes, resulting in equal and opposite changes in $Q_{top}$ and $Q_{bot}$. For example, as $d_{air}$ approaches zero, $Q_{bot}$ approaches zero while $Q_{top}$ approaches $Q_{PDMS}$. This surprising phenomenon is illustrated by FIG. 10B, in accordance with example detailed/experimental embodiments.

The previously presented Equations can be used to quantify voltage generation using an electronic skin pressure sensor in accordance with various embodiments. For example, taking the derivative of Equation 4, the following can be obtained:

$$\frac{\partial Q_{PDMS}}{\partial t} = -\left(\frac{\partial Q_{top}}{\partial t} + \frac{\partial Q_{bot}}{\partial t}\right) \quad \text{(Eq. 9)}$$

And assuming that $Q_{PDMS}$ is fixed, current generated can be expressed as:

$$I(t) = \frac{\partial Q_{top}}{\partial t} = -\frac{\partial Q_{bot}}{\partial t} \quad \text{(Eq. 10)}$$

Since the two electrodes (e.g., 1004, 1010) are connected through a resistor of resistance R, voltage across the resistor can be expressed as:

$$\frac{V_V(t)}{R} = \frac{\partial Q_{top}}{\partial t} = -\frac{\partial Q_{bot}}{\partial t} \quad \text{(Eq. 11)}$$

Taking the derivative of Equations 5, 6 and 11, the following can be obtained:

$$V(t) = R\frac{\partial (C_{top} \times (V_{top} - V_{PDMS}))}{\partial t}; C_{top} = \frac{\epsilon_{PDMS} A}{d_{PDMS}} \quad \text{(Eq. 12)}$$

$$V(t) = -R\frac{\partial (C_{bot} \times (V_{PDMS} - V_{bot}))}{\partial t}; C_{top} = \frac{\epsilon_{air} A}{d_{air}} \quad \text{(Eq. 13)}$$

To derive an equation for voltage generation, assume an open circuit condition, where the load resistance is sufficiently large to yield I(t)≈0. In other words, $Q_{top}$ and $Q_{bot}$ are approximately constant as a function of time. As described above, output voltage (V) is the electrostatic potential difference between the top and the bottom electrodes (e.g., 1004, 1010), or $V_{bot}$ since the top electrode is grounded: $V = V_{bot}(t) - V_{top}(t) = V_{bot}(t)$. The $d_{PDMS}$ can be assumed to be constant as a function of time (assume that the change in $d_{PDMS}$ is relatively small compared with change in $d_{air}$). Hence, $V_{PDMS}$ is constant as a function of time since the charges on the PDMS are fixed and $d_{PDMS}$ is assumed to be constant as a function of time. Taking these assumptions into consideration, Equations (12) and (13) can be rewritten as follows:

$$C_{top}\frac{\partial (V_{top} - V_{PDMS})}{\partial t} \approx 0 \quad \text{(Eq. 14)}$$

(noting that $C_{top}$ can be approximated to be time independent since $Q_{top}$ and $V_{top} - V_{PDMS}$ can be assumed to be constant with respect to time)

$$\frac{\partial C_{bot}}{\partial t}(W) + C_{bot}\frac{\partial (W)}{\partial t} = 0 \quad \text{(Eq. 15)}$$

(noting that $W = V_{bot} - V_{PDMS}$). Since:

$$C_{bot} = \frac{\epsilon_{air} A}{d_{air}}, \frac{\partial C_{bot}}{\partial t} = -\frac{C_{bot}}{d_{air}}\left(\frac{\partial d_{air}}{\partial t}\right),$$

then Equation 15 can be written as:

$$\frac{1}{d_{air}}\frac{\partial d_{air}}{\partial t} = \frac{1}{W}\frac{\partial (W)}{\partial t} \quad \text{(Eq. 16)}$$

The solution to this differential equation can include:

$$W = \alpha d_{air}; \alpha \text{ is a constant} \quad \text{(Eq. 17)}$$

Or equivalently, $$\Delta W = \alpha \Delta d_{air} \quad \text{(Eq. 18)},$$

Where, $\Delta W = (V_{final} - V_{PDMS}) - (V_{initial} - V_{PDMS}) = \Delta V$ and $\Delta d_{air} = d_{air\text{-}final} - d_{air\text{-}initial}$ Using Equations 17 and 18, the following can be obtained:

$$\Delta V = \frac{(V_{initial} - V_{PDMS})\Delta d_{air}}{d_{air}} \quad \text{(Eq. 19)}$$

$$\text{Where, } (V_{initial} - V_{PDMS}) = \frac{Q_{bot} d_{air}}{\epsilon_{air} A}$$

and resulting in Equation 4 as provided above. The pressure region where the gap region 1008 is deformed (≤1 kPa), $\Delta d_{air}$ is approximately linearly proportional to the pressure applied. Therefore, the change in voltage is linearly proportional to pressure applied.

Consistent with the discussion above with regard to FIGS. 1A-1D, FIGS. 11A-11C illustrate an example electronic skin pressure sensor and circuitry depicted generally to collect, measure, and/or harvest energy ensuing from a change in impedance due to the mechanical stimuli of lateral stress in accordance with various embodiments. As indicated, the circuitry of the pressure sensor includes the opposing electrodes (e.g., SWNT layers 1104, 1110) and a dielectric region (e.g., porous PDMS layers 1106 and gap region 1108). As illustrated by FIG. 11A, the electronic skin pressure sensor can be connected to circuitry. The circuitry (e.g., which can include sensor circuitry in various aspects), in various embodiments, can include an electrical circuit configured and arranged to use the energy harvested using the electronic skin pressure sensor. For example, the energy harvested can be used for supplementing a power source of a load 1130 in the form of the electrical circuit. The load 1130 can be internal to the electronic skin pressure sensor and/or sensor circuitry (e.g., provide power back to the electron-skin device) and/or an external circuitry (e.g., the light source illustrated by FIG. 11A).

FIG. 11B illustrates current generated in opposite directions when pressure is applied and released, in accordance with example detailed/experimental embodiments. FIG. 11C illustrates a change in voltage (ΔV) as linearly dependent on the applied pressure, (yielding ΔV equal to, for example, 13 V, 32 V, and 48 V, respectively), in accordance with example detailed/experimental embodiments. This experimental embodiment is consistent with Equation 4 (in the low pressure region <1 kPa, pressure was linearly proportional to Δd$_{air}$). Also, surprisingly, without a gap region, negligible voltage (and current) is generated, as depicted in FIG. 11C.

Figure 12A:
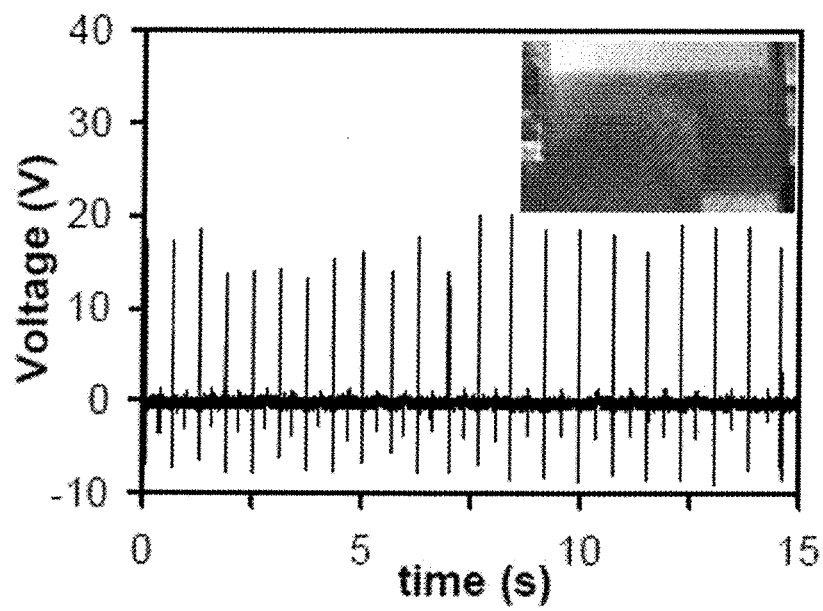
FIGS. 12A-F illustrate examples of collecting and/or harvesting energy from various mechanical stimuli using an electron skin pressure sensor in accordance with various embodiments.
Figure 12B:
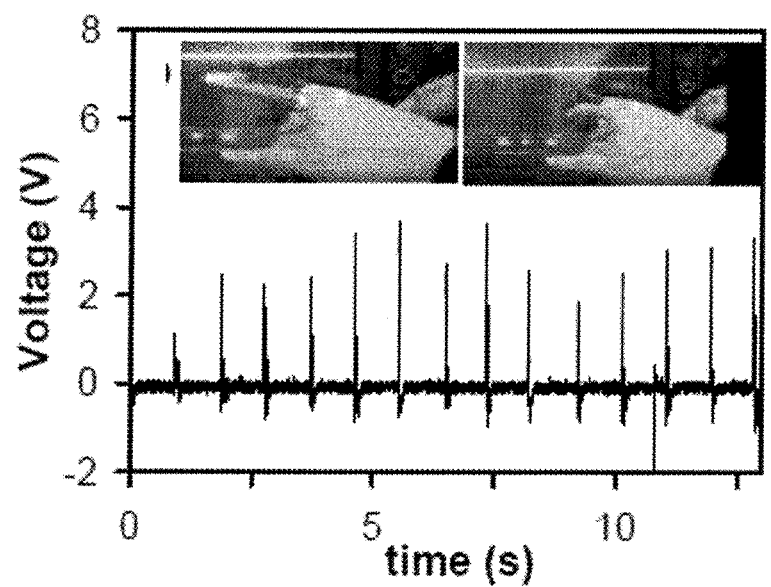
Figure 12C:
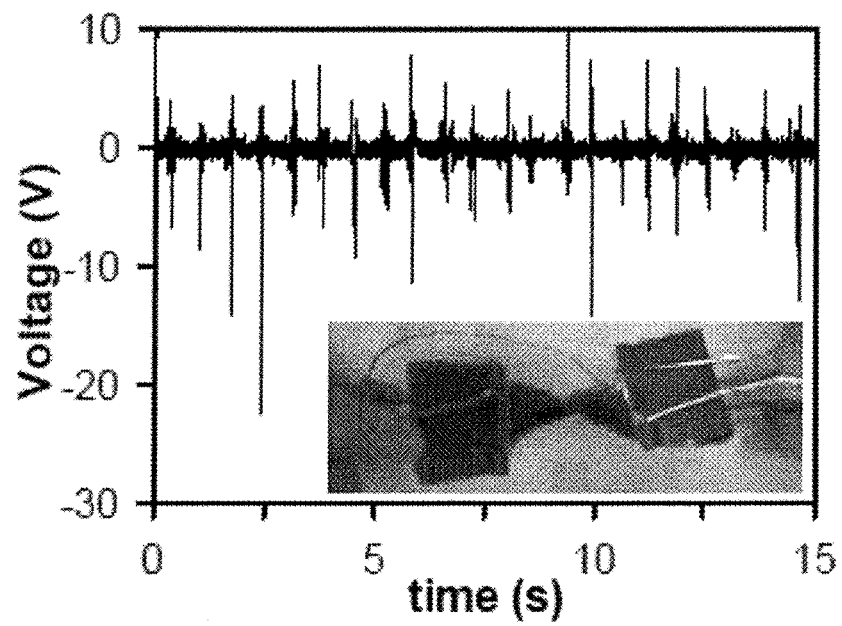
Figure 12D:
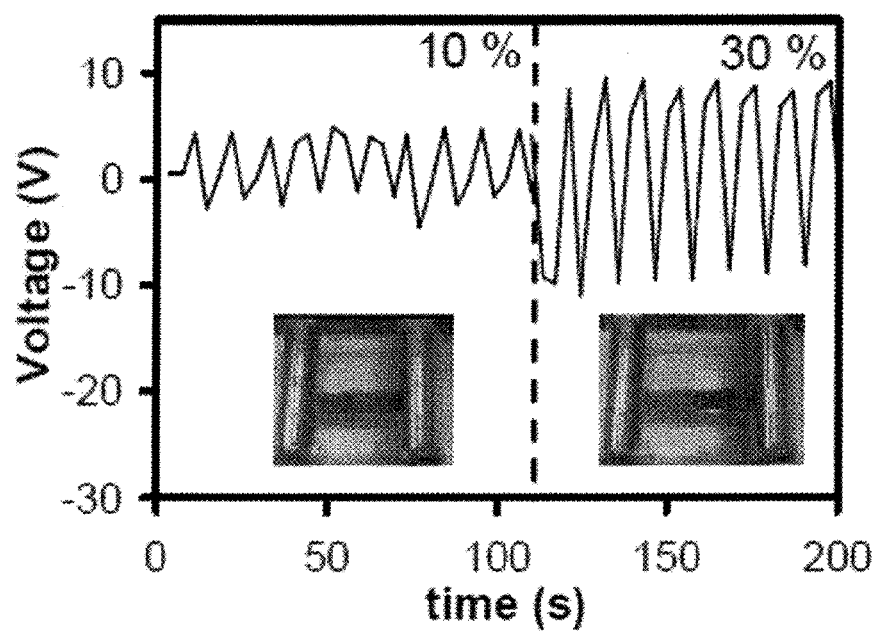
Figure 12E:
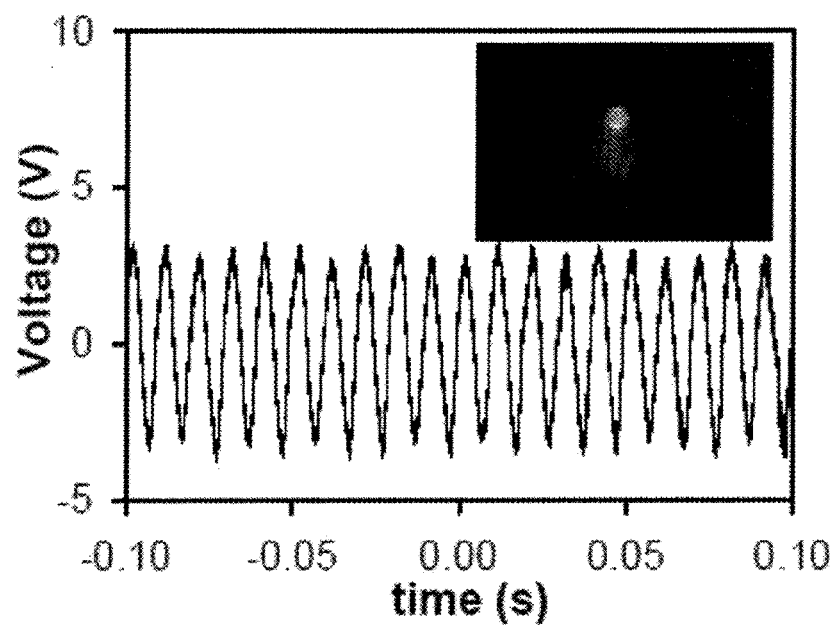

Consistent with the discussion above with regard to FIGS. 1A-1D, FIG. 12A-F illustrate examples of harvesting energy from various mechanical stimuli using an electron skin pressure sensor, in accordance with example detailed/experimental embodiments. As previously discussed, since power is generated through the change in the gap region, any movement that causes variation in the gap region can induce power generation. Hence, in accordance with various embodiments, the electronic skin pressure sensor can be used to generate power from a wide-variety of mechanical stimuli. The insets of FIG. 12A-D are images of corresponding mechanical stress applied from the mechanical stimuli, in accordance with example detailed/experimental embodiments. The inset of FIG. 12E is an image of a green light-emitting diode (LED) being turned on using sound-driven vibration.

For example, FIG. 12A illustrates voltage generation using a tapping pressure on an electronic skin pressure sensor of around 2 kPa. The tapping pressuring can be generated using finger tapping, for example. FIG. 12A shows voltage and current generated as a function of time, respectively, by repeatedly pressing down onto the electronic skin pressure sensor using a finger with an approximate pressure of 2 kPa. Under such repeated pressure, a voltage and current range of 25 V and 8 µA/cm$^2$ can be generated, respectively. In experimental embodiments, the durability of the electronic skin pressure sensors can be tested under repeated pressure and release of 1 kPa over 1000 cycles. The same range of voltage can be generated consistently over 1000 cycles, verifying the durability of such electronic skin pressure sensors under repeated pressure.

FIG. 12B illustrates an example of voltage generation from bending the electronic skin pressure sensor to seventy-five degrees after attaching the electronic skin pressure sensor to a finger of a human. Other practically encountered stresses in skin are bending, torsion, and lateral stress. To test energy harvesting due to bending, in experimental embodiments, an electronic skin pressure sensor can be placed on a finger, and bent and released repeatedly at an angle of seventy-five degrees, as depicted in FIG. 12B inset. As shown in FIG. 12B, this bending motion can generate voltage and current range of 3 V and 0.25 µA/cm$^2$, respectively.

FIG. 12C illustrates an example of voltage generation from twisting the electronic skin pressure sensor plus and minus one hundred eighty degrees. The electronic skin pressure sensor can also be placed under repeated torsion to plus and/or minus 180 degrees, as depicted in FIG. 12C inset. As seen in FIG. 12C, voltage and current range of 10 V and 0.5 µA/cm$^2$ can be generated, respectively.

FIG. 12D illustrates an example of voltage generation from laterally stressing the electronic skin pressure sensor to ten and thirty-percent. Voltage and current can be generated when an electronic skin pressure sensor is laterally strained to ten-percent and thirty-percent, respectively. For example, at ten-percent strain, voltage and current on the order of 8 V and 0.7 µA/cm$^2$ can be generated, respectively.

FIG. 12E illustrates an example of voltage generation from sound-driven vibration with sonic power and frequency of 100 dB and 100 Hz. Sound-driven vibration can be a viable source of energy. In experimental embodiments, an electronic skin pressure sensor can be placed under an input sonic power and frequency of 100 dB and 100 Hz, respectively. As shown in FIG. 12E, the input sonic wave generates sinusoidal waves of voltage and current as a function of time, with a range of V and 2 µA/cm$^2$, respectively. Using this AC voltage and current, a rectifying circuit can be used to convert the power to DC. The generated power can be sufficient to turn on a green LED by charging up a 100 microfarad (g) capacitor for 2 minutes (FIG. 12E inset).

Figure 12F:
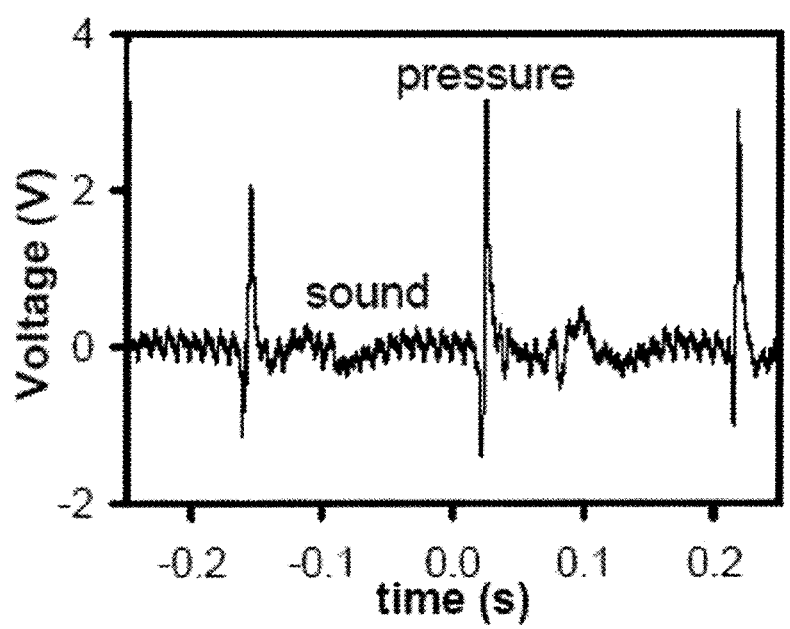

FIG. 12F illustrates voltage generated with simultaneous sound-driven vibration and pressure applied to an electronic skin pressure sensor using finger tapping of a human. FIG. 12F shows the voltage and current as a function of time, respectively, under both a sound-driven vibration and normal pressure, demonstrating that power can be generated from different mechanical stresses simultaneously. Such versatility in harvesting a variety of mechanical energy sources can be used to efficiently harvest all of the mechanical stimuli that the electronic skin pressure sensor may be exposed to during its operation.

Figure 13A:
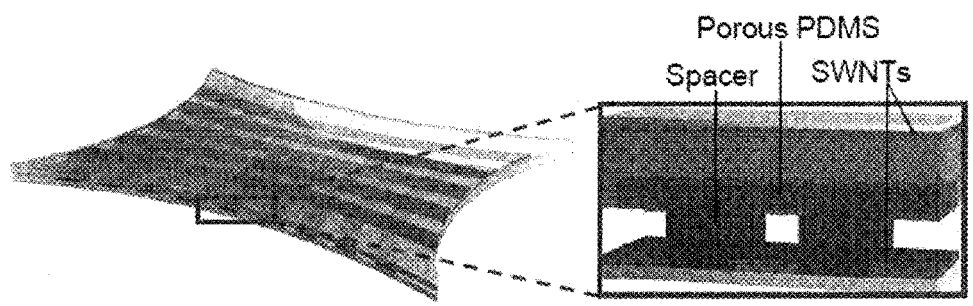
FIGS. 13A-E illustrate examples of position sensing using an electronic skin pressure sensor in accordance with various embodiments.
Figure 13B:

Consistent with the discussion above with regard to FIGS. 1A-1D and FIG. 4, FIGS. 13A-F illustrate examples of position sensing using an electronic skin pressure sensor, in accordance with example detailed/experimental embodiments. To demonstrate position sensing capacity of the electronic skin pressure sensors, a 5 by 5 pixel array with pixel area of 1×1 cm$^2$ separated by 3 millimeter (mm) can be generated. FIG. 13A illustrates a schematic representation of a position sensitive electronic skin pressure sensor with a cross-sectional close up of the schematic representation. FIG. 13B illustrates a top view of an image of the position sensitive electronic skin pressure sensor.

Figure 13D:
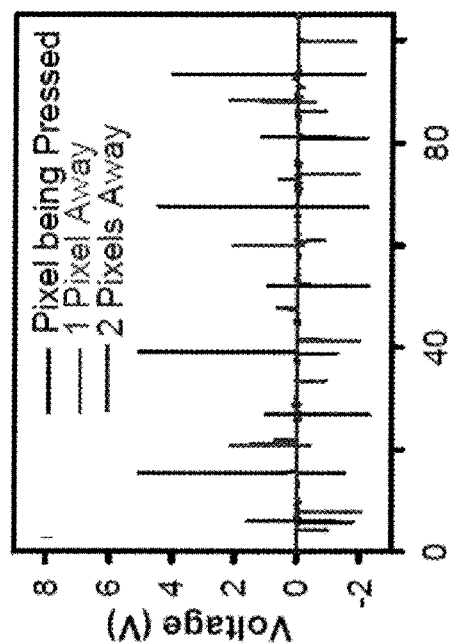
Figure 13C:
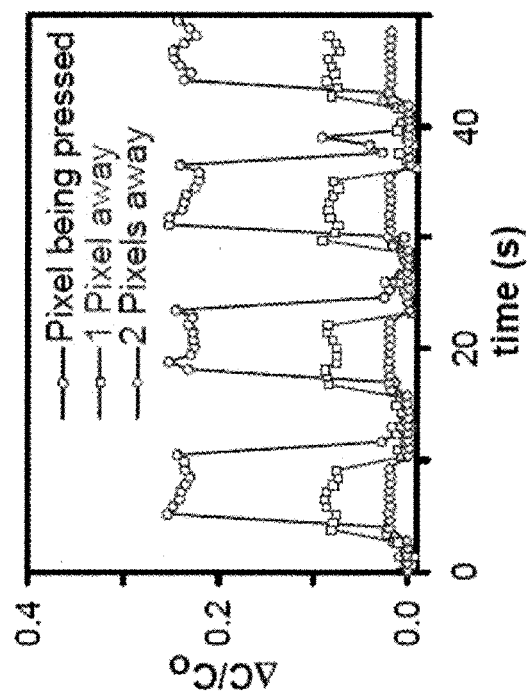

FIG. 13C illustrates a graph plotting a change in capacitance at a pixel of the electronic skin pressure sensor being pressed (e.g., circles), one pixel away from the pixel being pressed (e.g., square) and two pixels away from the pixel being pressed (e.g., diamond). The change in capacitance is the most dramatic at the pixel being pressed and decreases significantly going away from it. This feature can be used for position sensing.

FIG. 13D illustrates a graph plotting a change in voltage generated at a pixel of the electronic skin pressure sensor being pressed (e.g., circles), one pixel away from the pixel being pressed (e.g., square) and two pixels away from the pixel being pressed (e.g., diamond). The voltage generation can also be observed to decrease moving away from the pixel being pressed with similar trends, as depicted in FIG. 13D.

Figure 13E:
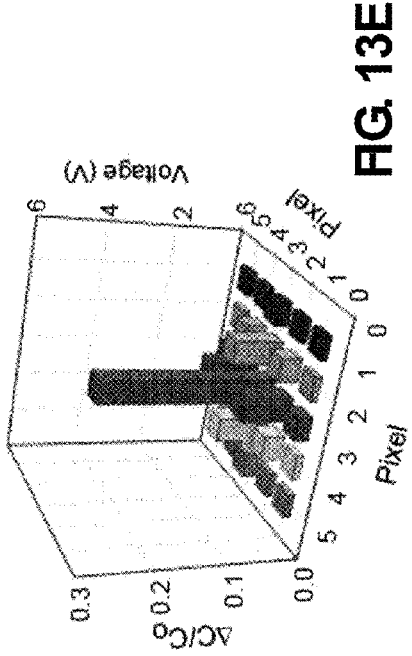
Figure 14:
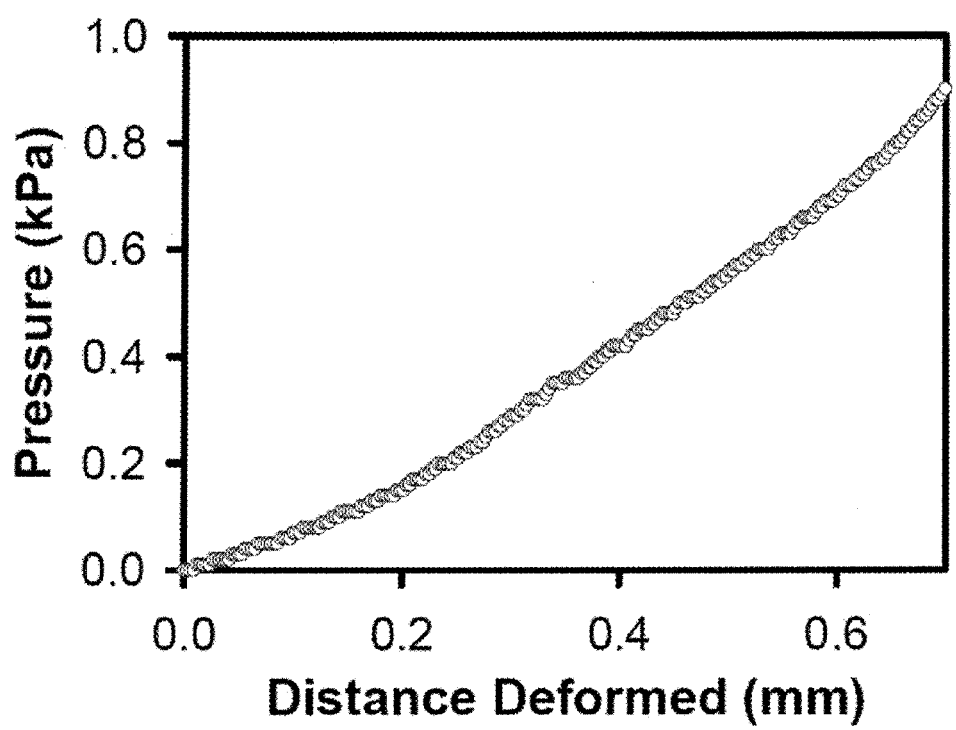
FIG. 14 illustrates an example graph plotting pressure verses distance deformed of electronic skin pressure sensor in the low pressure region in accordance with various embodiments.
Figure 15:
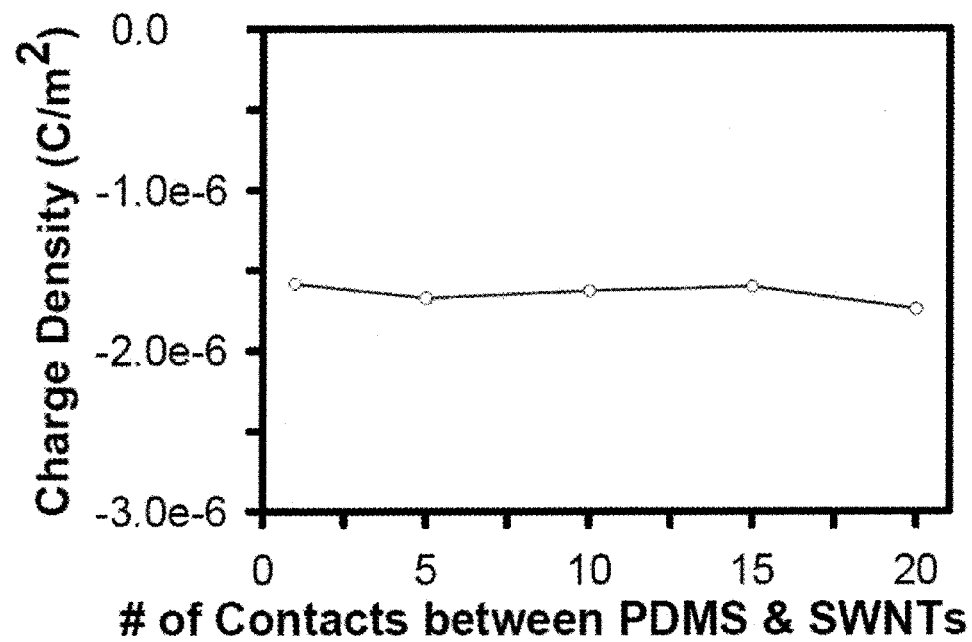
FIG. 15 illustrates an example graph plotting surface density verses number of contacts between the PDSM surface and SWNT-film of an electronic skin pressure sensor in accordance with various embodiments.

FIG. 13E illustrates a pressure map of plotting the change in capacitance and voltage generation at a pixel of the electronic skin pressure sensor being pressed (e.g., represented by the circles), one pixel away from the pixel being pressed (e.g., represented by the squares) and two pixels away from the pixel being pressed (e.g., represented by the diamonds). As previously discussed, in various embodiments, an apparatus can include an array of electronic skin pressure sensors. An array of pressure-based sensors can be formed on a substrate. For example, the array of pressure sensors can be formed using parallel strips of the first and second electrodes that are oriented perpendicular to each other to create a pixel array. PDMS blocks can be placed at the corners of every pixel to create the gap regions.

Each of these sensors may be implemented, for example, as a sensor such as shown in FIG. 1. Outputs of the sensors are coupled to the sensor circuitry, which processes the outputs to provide pressure, location information, sense a change in impedance, and/or collect or harvest energy. For example, each of the sensors may be coupled directly to the sensory circuitry, or an array of interconnecting circuits in the substrate may be made to provide an addressable output corresponding to a position of the respective sensors (e.g., in rows and columns), with a single lead connected to processing circuitry.

When pressure is applied to the flexible substrate, the dielectric regions compress at a region near the applied pressure, and the underlying sensors sense the applied pressure via a change in dielectric properties of the dielectric regions near the sensor. By processing outputs of the sensors at sensor circuitry, an indication of both a location and an amount of pressure applied to the flexible substrate can be provided, among other information and/or harvesting of energy. The sensors exhibit electrical changes based on the deformation and resulting changes in dielectric properties, thus providing an indication of the pressure. In this context, a three-dimensional pressure-sensing device is provided, sensing both position (e.g., in an x-y direction of a plane in which the sensors lie) and pressure (e.g., in a z direction into/about perpendicular to the aforesaid plane).

The pixel can be pressed at 0.5 kPa, for example. FIG. 13E is a 2 D pressure map showing the change in capacitance and voltage generated at each pixel when the center pixel is pressed at 0.5 kPa. The resolution of the electronic skin pressure sensors can be improved using high resolution shadow masking or transfer printing, which can allow for mimicking of position sensitivity of human skin.

Additional Detailed or Experimental
Embodiments/Results

Certain specific pressure sensors in accordance with the present disclosure include stretchable energy harvesting electronic skin (EHES) pressure sensors capable of sensing, differentiating, and harvesting a wide-variety of tactile information such as normal pressure, lateral stress (e.g., straining), bending, and sound-driven vibration. Using PDMS micro structuring in combination with a gap region, can allow for pressure sensing from several Pa to tens of kPa, with an average and maximum sensitivity of 0.7 $kPa^{-1}$ and 1.5 $kPa^{-1}$, respectively, in the pressure region <1 kPa. The pressure sensitivity can be high in comparison to other stretchable capacitive pressure sensors: 0.23 $kPa^{-1}$ (ref 20), 0.0004 (ref 45), 0.0002 kPa' (ref 21). Electronic skin pressure sensors in accordance with the present disclosure are surprisingly capable of differentiating different tactile signals by measuring three different output signals (capacitance, resistance of the top and resistance of the bottom electrode). The capacitive design can allow for the top and the bottom electrodes to be electrically isolated so that the measured change in film resistance is due to the lateral stressing of each film, not due to the electrical conduction between the top and bottom electrodes.

Voltage and current in the range of tens of volts and tenths to several $\mu A/cm^2$ can be generated using electronic skin pressure sensors in accordance with various detailed/experimental embodiments, respectively, yielding instantaneous power generation on the order of several to tens of $\mu W/cm^2$. Such an energy harvesting functionality can potentially be utilized to not only operate an electronic skin pressure sensor itself, but also power wearable health monitoring sensors (e.g., temperature sensor, ECG (Electrocardiogram) sensor, blood pressure sensor). Power generation can further increase through the enhancement of triboelectric effect (e.g., through the use of two surfaces with substantially different polarities) or by inducing higher charge density on the dielectric surface using surface charging techniques. The energy harvesting electronic skin pressure sensor and the various aspects herein can be utilized with a fully self-sustainable skin-like device with stretchability, multifunctional tactile sensing, and energy harvesting capability.

In various embodiments, the electron skin pressure sensors can be formed by molding layer by layer. For example, the PDMS layers can be formed by treating a pattern silicon mold (with 2 μm wide and 100 Σm tall pillars with a pitch of 4 μm) and a silicon wafer with oxygen plasma for 1 minute at 150 W. Subsequently, the silicon mold and the silicon wafer can be placed in a vacuumed dessicator with a glass vial of 100 microliters (μL) of (tridecafluoro-1,1,2,2-tetrahydrooctyl)trichlorosilane for 4 hours. This can make the surface hydrophobic and ensure that the PDMS do not adhere to the surface of silicon mold. The PDMS can include a SYLGARD 184 Silicone Elastomer Kit. To prepare the PDMS mixture, 60 grams of Elastomer base can be mixed with 6 grams of its curing agent. The PDMS mixture can then be poured onto the patterned silicon mold and the silicon wafer. The silicon mold and the silicon wafer can be tilted back and forth to ensure that PDMS is distributed evenly throughout all areas. The PDMS covered silicon mold and wafer can be vacuumed in the dessicator for 2-3 hours (or until the bubbles were no longer visible). The mold and the wafer can be leveled, as this determines the PDMS thickness uniformity. Finally, the PDMS covered silicon mold and the silicon wafer can be placed in an oven for 2 hours at 70 degrees Celsius (C) to cure the PDMS. The thickness of the PDMS may be between 0.5 to 0.7 mm.

Other related embodiments can include forming the SWNT solution. For example, 1.5 milligram (mg) of Arc-Discharge SWNTs purchased from Hanwha Nanotech (Grade ASP-100F) can be dispersed in 15 mL of NMP (Nmethylpyrrolidinone) by sonicating the solution for 30 minutes in ultrasonicator (Cole Parmer) at 30 percent amplitude. Subsequently, the solution can be centrifuged at 10,000 revolutions per minute (RPM) for 1 hour, and the supernatant can be extracted out.

In various aspects, the PDMS covered silicon mold and wafer can be UVO treated for 15 minutes with the PDMS side up, and placed on a hot plate pre-heated to 190 degrees C. The SWNTs can be uniformly spray coated on top of the PDMS surfaces (for example, approximately 5-6 mL of SWNT solution for 4 inch wafer area). To fabricate an array of electrodes (for position sensing devices), SWNTs can be spray coated with a metal shadow mask (1 cm thick opening with 3 mm spacing) placed on top. Wire bonding can be conducted using copper tape. On the SWNT-film/PDMS/silicon mold structure, PDMS mixture with the aforementioned mixing ratio can be spin-cast at 8000 rpm for 10 minutes. The PDMS on the silicon mold can be carefully peeled off, and briefly treated with UVO for 20 seconds with the porous PDMS side up. Finally, PDMS on the silicon mold and on the wafer can be stacked one on top of the other, with blocks (e.g., spacers) sandwiched in between. The blocks can be composed of PDMS, with diameter and thickness of 3 mm and 0.7-1 mm, respectively. For the pixilated pressure sensor apparatus, parallel strips of the top and bottom electrodes can be oriented perpendicular to each other to create a 5 by 5 pixel array with pixel area of 1×1 $cm^2$ separated by 3 mm. PDMS blocks can be placed at the corners of every pixel.

In experimental embodiments discussed herein, current and voltage measurements can be conducted either using Keithley 4200-SCS (current measured with a short circuit, and voltage measured with an open circuit with current set to zero using an internal resistance of 1013 Ohms) or using a close loop oscilloscope with internal resistance of 106

Ohms. Capacitance and resistance measurements can be conducted using Agilent E4980A, Precision LCR Meter. Pressure can be measured using Mark-10 Model BG05 Series BG.

Consistent with the discussion above with regard to FIGS. 1A-1D, FIG. 14 illustrates an example graph plotting pressure verses distance deformed of an electronic skin pressure sensor in the low pressure region in accordance with various detailed/experimental embodiments. As illustrated, the pressure is approximately linearly dependent on change in the distance deformed as pressure is applied.

Consistent with the discussion above with regard to FIGS. 1A-1D, FIG. 15 illustrates an example graph plotting surface charge density on PDMS version number of contacts between the PDSM surface and SWNT-film of an electronic skin pressure sensor in accordance with various detailed/experimental embodiments. As illustrated, the surface charge density is maintained around $-1.7$ $C/m^2$ during operation of the electronic skin pressure sensor.

Figure 16A:
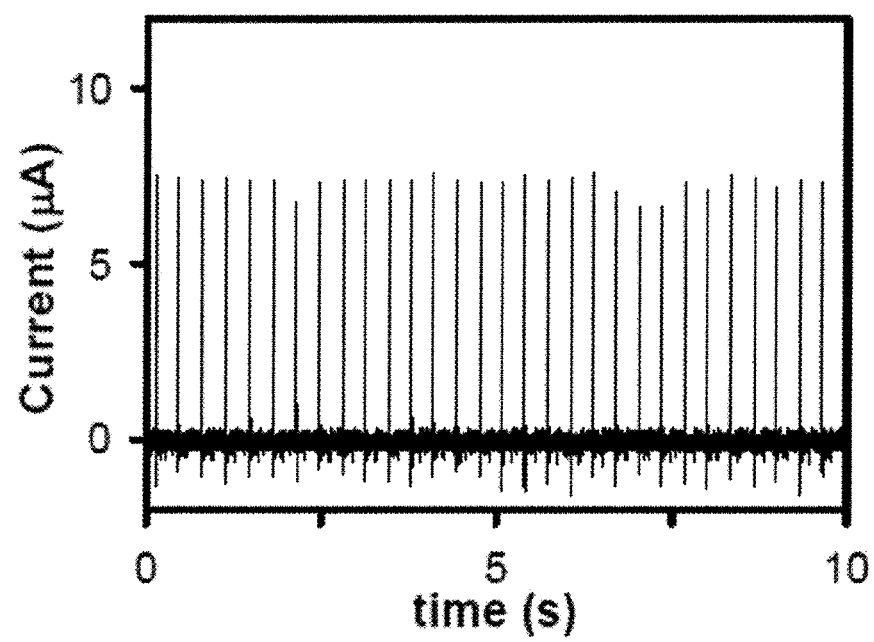
FIGS. 16A-F illustrates an example graph plotting current generated verses time of an electronic skin pressure sensor in response to various mechanical stimuli in accordance with various embodiments.
Figure 16B:
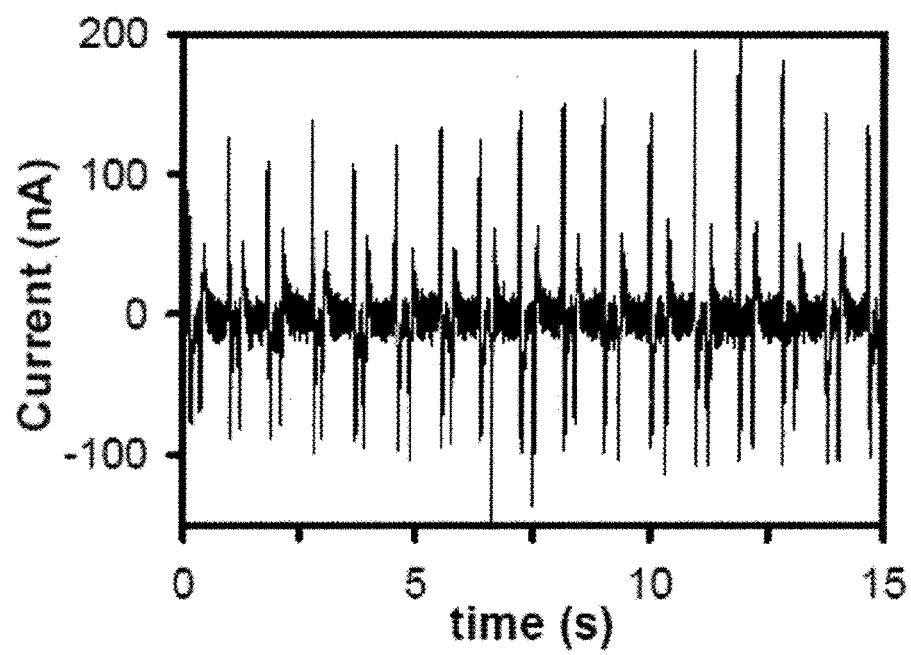
Figure 16C:
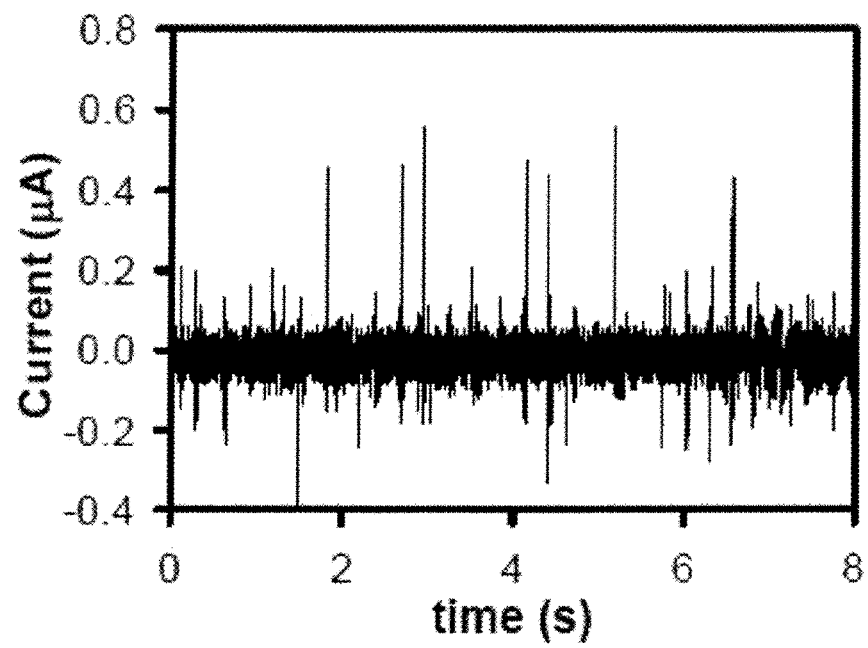
Figure 16D:
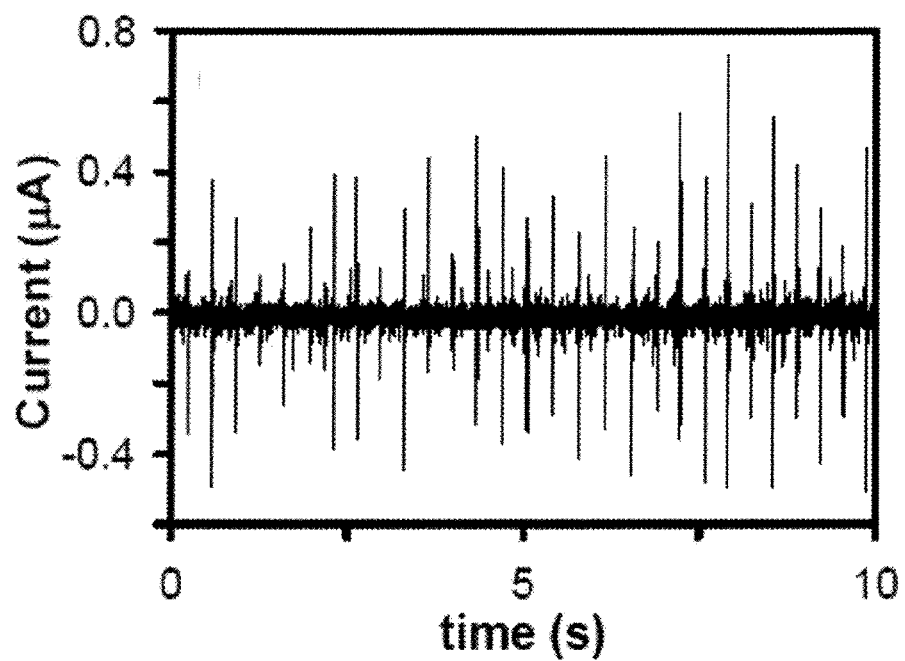
Figure 16E:
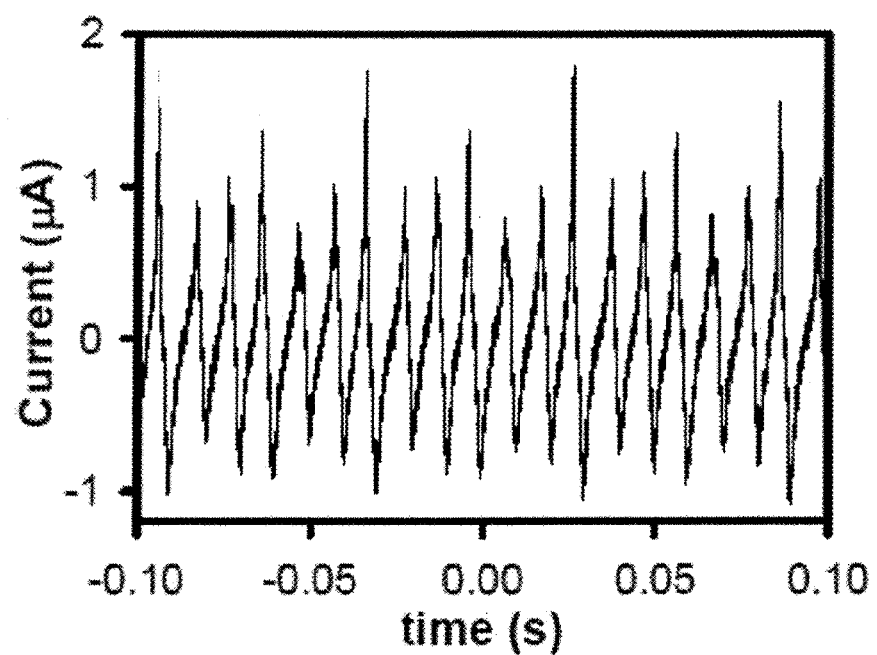
Figure 16F:
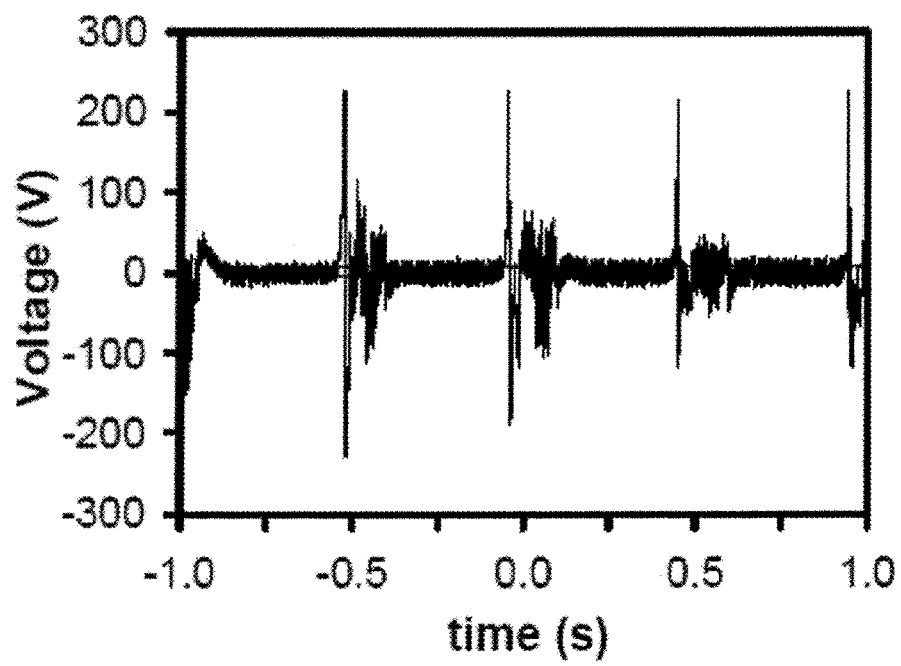
Figure 17:
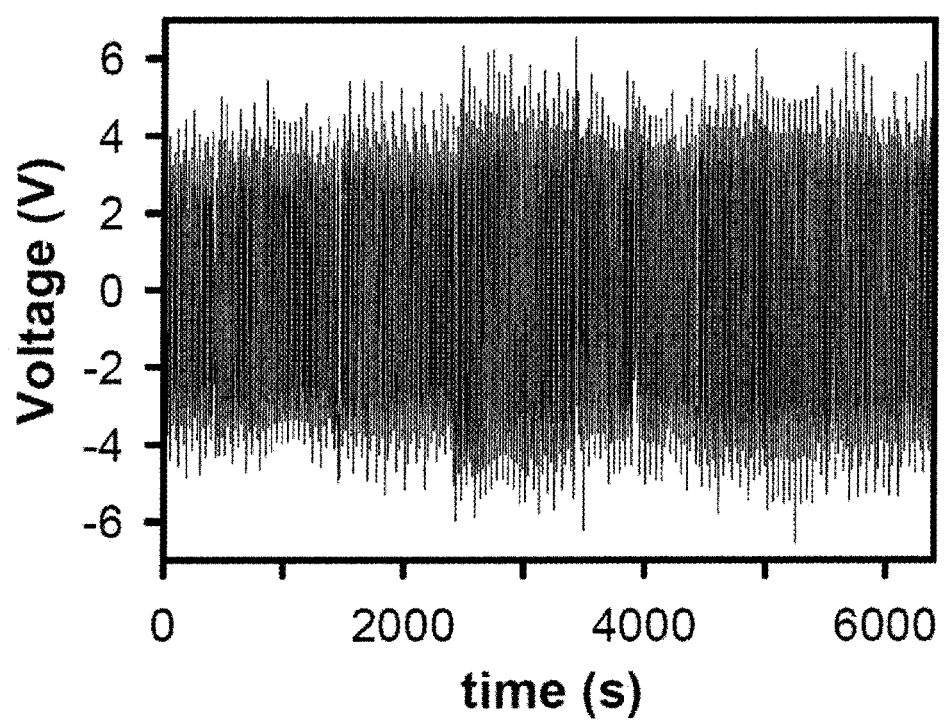
FIG. 17 illustrates an example graph plotting voltage generation of an electronic skin pressure sensor under 100 cycles and at a repeated pressure of 1 kPa in accordance with various embodiments.

Consistent with the discussion above with regard to FIGS. 1A-1D, FIGS. 16A-F illustrate an example graph plotting current verses time of an electronic skin pressure sensor in response to various mechanical stimuli in accordance with various detailed/experimental embodiments. For example, FIG. 16A illustrates current generation normalized to $cm^2$ area in response to finger tapping with a pressure of 2 kPa. FIG. 16B illustrates current generation normalized to $cm^2$ area in response to bending the electronic skin pressure sensor to seventy-five degrees after being attached to a finger of a human. FIG. 16C illustrates current generation normalized to $cm^2$ area in response to twisting the electronic skin pressure sensor to plus and minus one hundred and eighty degrees. FIG. 16D illustrates current generation normalized to $cm^2$ area in response to laterally stressing (e.g., straining) the electronic skin pressure sensor to ten-percent. FIG. 16E illustrates current generation normalized to $cm^2$ area in response to a sound-driven vibration with sonic power and frequency of 100 dB and 100 Hz. FIG. 16F illustrates current generation normalized to $cm^2$ area in response to a sound-driven vibration and pressure applied via finger tapping.

Consistent with the discussion above with regard to FIGS. 1A-1D, FIG. 17 illustrates an example graph plotting voltage generation of an electronic skin pressure sensor under 100 cycles (lasting approximately 6000 seconds) and at a repeated pressure of 1 kPa in accordance with various detailed/experimental embodiments. The plot shows consistent voltage generation throughout the test, verifying the durability of example electronic skin pressure sensors under repeated mechanical stimulus.

The skilled artisan would appreciate that each of FIGS. 1A through 17 are related embodiments with aspects that may be used separately by themselves to build certain-parts of the devices disclosed herein and/or in combination with other aspects shown and/or discussed in connection with the Figures. For example, the electronic skin pressure sensor and the sensor circuitry can be implemented together or separately as explained herein, whether in an array or otherwise (see e.g., electronic pressure skin pressure sensor as in FIGS. 1A, 1B, 4, and 5B and sensor circuitry as discussed in connection FIGS. 10A-10B and the above discussed output circuitry used with the array).

The Appendices of the underlying provisional application are hereby fully incorporated by reference for their general and specific teachings: Appendix A1 is entitled "Applications of E-Skin" and Appendix A2 is entitled "Multifunctional, flexible electronic systems based on engineered nanostructured materials." Consistent with embodiments of the present disclosure, Appendix A1 describes and shows examples of electronic skin pressure sensors in accordance with the present disclosure. Appendix A2 describes and shows examples of circuitry, modules and architecture of the electronic devices as may be used with/for the aspects disclosed/claimed herein. These documents are fully incorporated herein by reference for their teachings (including background references cited therein and which disclose applications beneficial to aspects of the present disclosure), generally and specifically, to the structures, circuitry, stimuli-responsive devices and processes described and shown therein.

As illustrated, various modules and/or other circuit-based building blocks (shown in the immediately preceding figure) may be implemented to carry out one or more of the operations and activities described herein or in the Appendices, and/or shown in the block-diagram-type figures. In such contexts, these modules and/or building blocks represent circuits that carry out one or more of these or related operations/activities. For example, in certain of the embodiments discussed above and in the Appendices, one or more modules and/or blocks are discrete logic circuits or programmable logic circuits configured and arranged for implementing these operations/activities, as in the circuit modules/blocks shown above and in the Appendices. In such contexts, these modules and/or building blocks represent circuits and/or material-based structures that carry out one or more of these or related operations/activities.

In certain embodiments, the programmable circuit is one or more computer circuits programmed to execute a set (or sets) of instructions (and/or configuration data). Similarly, reference to the term "sensor" refers to a tangible and physical structure, that includes circuitry, and that responds to input from a physical environment (e.g., such as the skin to which the structure is secured) and then reacts to the input in a particular way as dictated by the circuitry. The instructions (and/or configuration data) can be in the form of firmware or software stored in and accessible from a memory (circuit). As an example, first and second modules/blocks include a combination of a CPU hardware-based circuit and a set of instructions in the form of firmware, where the first module/block includes a first CPU hardware circuit with one set of instructions and the second module/block includes a second CPU hardware circuit with another set of instructions.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Various embodiments described above, and discussed herein and Appendices may be implemented together and/or in other manners. One or more of the items depicted in the present disclosure and in the Appendices can also be implemented separately or in a more integrated manner, or removed, as is useful in accordance with particular applications. In view of the description herein, those skilled in the art will recognize that many changes may be made thereto without departing from the spirit and scope of the present disclosure.

What is claimed is:

1. An apparatus comprising:
   an electronic skin pressure sensor configured and arranged for differentiating between different mechanical stimuli including lateral stress and at least one additional mechanical stimuli; and
   sensor circuitry configured and arranged to respond to the electronic skin pressure sensor by sensing a change in impedance due to the lateral stress and due to the at least one additional mechanical stimuli, and by collecting energy in a form that indicates when the sensor circuitry is responding to one of, versus the other of, the lateral stress and the at least one additional mechanical stimuli.

2. The apparatus of claim 1, wherein the electronic skin pressure sensor includes circuitry configured and arranged to differentiate between the different mechanical stimuli by outputting a signal indicative of pressure and wherein the at least one additional mechanical stimuli includes a mechanical stimuli selected from the group consisting of: pressure, bending, flexing, and a combination thereof.

3. The apparatus of claim 1, wherein the sensed change in impedance includes a change in capacitance and a change in film-resistance and the electronic skin pressure sensor further includes:
   a first electrode and a second electrode, each electrode formed of a film of carbon nanostructures; and
   a dielectric region between the first and the second electrode configured and arranged to deform in response to different mechanical stimuli applied to the electronic skin pressure sensor, and wherein the first and second electrodes are configured and arranged to provide an electrical characteristic indicative of a respective mechanical stimuli in response to a deformation of the dielectric region.

4. The apparatus of claim 3, wherein the dielectric region includes a layer of porous silicon material and a gap region formed by at least two silicon blocks.

5. The apparatus of claim 1, wherein the electronic skin pressure sensor is comprised of a plurality of layers of different materials, wherein at least one layer is comprised of a porous polydimethylsiloxane (PDMS) surface configured and arranged to enhance pressure sensing sensitivity.

6. The apparatus of claim 1, wherein the sensed change in impedance includes an impedance selected from the group consisting of: capacitance, film-resistance, and a combination thereof, and
   wherein the lateral stress includes stress selected from the group consisting of: lateral strain, lateral tension, and a combination thereof.

7. The apparatus of claim 1, wherein the electronic skin pressure sensor includes a first electrode and a second electrode, and the sensed change in impedance includes a change in capacitance, a change in film-resistance of the first electrode, and a change in film-resistance of the second electrode.

8. The apparatus of claim 1, wherein the electronic skin pressure sensor includes an array of pressure sensors, each pressure sensor of the array including circuitry configured and arranged to measure pressure, and
   wherein the sensor circuitry is further configured and arranged to respond to the electronic skin pressure sensor by:
   sensing a change in impedance of at least one pressure sensor of the array; and
   detecting a position of the mechanical stimuli in response to the sensed change in impedance of the at least one pressure sensor.

9. An apparatus comprising:
   an electronic skin pressure sensor configured and arranged for differentiating between different mechanical stimuli including lateral stress and at least one additional mechanical stimuli; and
   sensor circuitry configured and arranged to respond to the electronic skin pressure sensor by sensing a change in impedance due to the lateral stress, wherein the sensor circuitry is further configured and arranged to collect energy ensuing from the change in impedance due to the lateral stress.

10. The apparatus of claim 9, further including storage circuitry configured and arranged to store the collected energy and to provide the energy to a load.

11. The apparatus of claim 1, further including additional circuitry configured and arranged to collect energy ensuing from the change in impedance due to the lateral stress and to provide the energy to a load.

12. An apparatus comprising:
    an electronic skin pressure sensor including circuitry configured and arranged to differentiate between different mechanical stimuli by outputting a signal indicative of pressure, the different mechanical stimuli including lateral stress and a mechanical stimuli selected from the group consisting of: pressure, bending, flexing, and a combination thereof; and
    sensor circuitry configured and arranged to respond to the electronic skin pressure sensor by collecting energy ensuing from a change in film-impedance due to the lateral stress.

13. The apparatus of claim 12, wherein the sensor circuitry is configured and arranged to provide the energy to a circuitry selected from the group consisting of: storage circuitry, an internal load of the apparatus, an external load, and a combination thereof.

14. The apparatus of claim 12, further including a stretchable electronic circuitry configured and arranged to consume power, at least in part, by harvesting the collected energy from the change in film-impedance due to the lateral stress.

15. The apparatus of claim 14, further includes silver nanostructures configured and arranged with the stretchable electronic circuitry.

16. The apparatus of claim 12, wherein the electronic skin pressure sensor is comprised of a plurality of layers of different materials, wherein at least one layer is comprised of nanostructures configured and arranged to facilitate stretchability attributes of the apparatus.

17. The apparatus of claim 12, wherein the electronic skin pressure sensor is comprised of a plurality of layers of different materials, wherein at least one layer is comprised of a chargeable polydimethylsiloxane (PDMS) surface for interfacing with a user's skin.

18. A method comprising:
    providing output signals indicative of pressure applied using an electronic skin pressure sensor;
    differentiating between different mechanical stimuli including lateral stress and a mechanical stimuli selected from the group consisting of: pressure, bending, flexing, and a combination thereof, in response to the output signals;
    sensing a change in impedance due to the lateral stress using sensor circuitry; and
    collecting energy ensuing from the change in impedance due to the lateral stress.

19. The method of claim 18, further including using the energy ensuing therefrom, via the sensor circuitry, for supplementing a power source of a load in a form of an electrical circuit.

20. The method of claim 18, further including storing the energy using a storage circuit, the storage circuitry including a circuit selected from the group consisting of: a supercapacitor, a stretchable supercapacitor, and a rechargeable battery, and a combination thereof.

21. An apparatus comprising:
- an electronic skin pressure sensor configured and arranged for differentiating between different mechanical stimuli including lateral stress and at least one additional mechanical stimuli;
- sensor circuitry configured and arranged to respond to the electronic skin pressure sensor by sensing a change in impedance due to the lateral stress; and
- a first electrode and a second electrode and including a porous dielectric region between the first and the second electrode, each of the first and second electrodes being integrated with the electronic skin pressure sensor, and wherein the porous dielectric region is configured and arranged to deform in response to the different mechanical stimuli applied to the electronic skin pressure sensor, and wherein the sensor circuitry is further configured and arranged to indicate presence of one of the lateral stress and the at least one additional mechanical stimuli.

* * * * *